(12) United States Patent
Odaira

(10) Patent No.: US 11,150,459 B2
(45) Date of Patent: Oct. 19, 2021

(54) SAMPLE OBSERVATION DEVICE WITH FOCUSING FUNCTION

(71) Applicant: OLYMPUS CORPORATION, Tokyo (JP)

(72) Inventor: Mayumi Odaira, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 229 days.

(21) Appl. No.: 16/598,040

(22) Filed: Oct. 10, 2019

(65) Prior Publication Data
US 2020/0041777 A1 Feb. 6, 2020

Related U.S. Application Data

(63) Continuation of application No. PCT/JP2017/017532, filed on May 9, 2017.

(51) Int. Cl.
*G02B 21/24* (2006.01)
*G02B 7/36* (2021.01)
*G02B 21/08* (2006.01)

(52) U.S. Cl.
CPC ........... *G02B 21/244* (2013.01); *G02B 7/36* (2013.01); *G02B 21/08* (2013.01)

(58) Field of Classification Search
CPC ......... G02B 21/244; G02B 7/36; G02B 21/08
See application file for complete search history.

(56) References Cited

U.S. PATENT DOCUMENTS

| 6,614,596 | B2* | 9/2003 | Gladnick | G01N 21/8806 |
| | | | | 359/630 |
| 7,800,821 | B2* | 9/2010 | Yamazaki | G02B 21/084 |
| | | | | 359/387 |

(Continued)

FOREIGN PATENT DOCUMENTS

| JP | 61-202343 A | 9/1986 |
| JP | 63-153419 A | 6/1988 |

(Continued)

OTHER PUBLICATIONS

International Search Report and Written Opinion dated Aug. 8, 2017 received in PCT/JP2017/017532.

(Continued)

*Primary Examiner* — Robert E. Tallman
(74) *Attorney, Agent, or Firm* — Scully, Scott, Murphy & Presser, P.C.

(57) ABSTRACT

A sample observation device includes a light source, an illumination optical system, an observation optical system, a detector, a processor, and a drive controller. The illumination optical system includes a condenser lens and an aperture, and the observation optical system includes an objective lens and a light attenuation member. The light attenuation member and the aperture are conjugate. The aperture includes an aperture region, and the light attenuation member includes a light attenuation region. A size of the aperture region, a position of the aperture region, a size of the light attenuation region, and a position of the light attenuation region are set such that a predetermined state is generated. The processor determines light quantity of light received with the detector. The drive controller changes an interval between a sample and the objective lens on the basis of the light quantity such that the light quantity becomes minimum.

9 Claims, 17 Drawing Sheets

(56) References Cited

U.S. PATENT DOCUMENTS

| | | | | |
|---|---|---|---|---|
| 2002/0191281 A1* | 12/2002 | Osa | ..................... | G02B 21/06 |
| | | | | 359/385 |
| 2003/0030902 A1* | 2/2003 | Fukushima | .......... | G02B 21/086 |
| | | | | 359/388 |
| 2013/0107279 A1* | 5/2013 | Yamaguchi | ............ | G02B 21/08 |
| | | | | 356/614 |
| 2016/0357002 A1 | 12/2016 | Suzuki et al. | | |

FOREIGN PATENT DOCUMENTS

| JP | 63-221310 A | 9/1988 |
|---|---|---|
| JP | 2-190808 A | 7/1990 |
| JP | 2002-162558 A | 6/2002 |
| JP | 2015-158570 A | 9/2015 |

OTHER PUBLICATIONS

English translation of International Preliminary Report on Patentability dated Nov. 21, 2019, together with the Written Opinion received in related International Application No. PCT/JP2017/017532.

\* cited by examiner

SAMPLE OBSERVATION DEVICE WITH FOCUSING FUNCTION

CROSS-REFERENCE TO RELATED APPLICATION

The present application is a continuation application of International Application No. PCT/JP2017/017532 filed on May 9, 2017, the entire contents of which are incorporated herein by reference.

BACKGROUND OF THE INVENTION

Field of the Invention

The present invention relates to a sample observation device having a focusing function.

Description of the Related Art

As a method of autofocusing, for example, contrast AF exists. In the contrast AF, a value of contrast is calculated on the basis of an image of an observation image captured with an image pickup element. The value of contrast is determined, for example, from a sum of squared difference of adjacent pixels in a focused image region.

In a microscope with contrast AF, a value of contrast is evaluated at an interval between the sample and the objective lens of the microscope while changing the interval. The state in which the value of contrast becomes maximum is determined as an in-focus state.

Japanese Patent Application Laid-open No. 2002-162558 discloses a focusing device adopting contrast AF. In the focusing device disclosed in Patent Document 1, the value of contrast is calculated using all the pixels, or part of pixels, of an image obtained by image pickup.

SUMMARY OF THE INVENTION

A sample observation device including a focusing function according to the present invention comprises:
a light source, an illumination optical system, an observation optical system, a detector, a processor, and a drive controller, wherein
the illumination optical system includes a condenser lens and an aperture,
the observation optical system includes an objective lens and a light attenuation member,
the aperture is disposed at a pupil position of the illumination optical system, or disposed at a position conjugate with a pupil of the illumination optical system,
the light attenuation member is disposed at a position conjugate with the aperture,
the aperture includes an aperture region,
the light attenuation member includes a light attenuation region,
a determination region is a region including both an image of the aperture region and the light attenuation region,
a predetermined state is a state in which the image of the aperture region is positioned only in an area of the light attenuation region in the determination region,
a size of the aperture region, a position of the aperture region, a size of the light attenuation region, and a position of the light attenuation region are set to such that the predetermined state is generated, illumination light irradiated to a sample with the illumination optical system is transmitted through the sample and thereafter made incident on the observation optical system,
the detector receives light emanated from the observation optical system,
the processor determines light quantity of the light received with the detector, and
the drive controller changes an interval between the sample and the objective lens on the basis of the light quantity such that the light quantity becomes minimum.

DETAILED DESCRIPTION OF THE INVENTION

Action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A sample observation device having a focusing function according to the present embodiment includes a light source, an illumination optical system, an observation optical system, a detection element, a processing device, and a drive control device. The illumination optical system includes a condenser lens and an aperture member, and the observation optical system includes an objective lens and a light attenuation member. The aperture member is disposed at a pupil position of the illumination optical system, or disposed at a position conjugate with a pupil of the illumination optical system, and the light attenuation member is disposed at a position conjugate with the aperture member. The aperture member includes an aperture region, and the light attenuation member includes a light attenuation region. A determination region is a region including both an image of the aperture region and the light attenuation region. A predetermined state is a state in which the image of the aperture region is positioned only in an area of the light attenuation region in the determination region. A size of the aperture region, a position of the aperture region, a size of the light attenuation region, and a position of the light attenuation region are set such that the predetermined state is generated. Illumination light irradiated to a sample with the illumination optical system is transmitted through the sample and thereafter made incident on the observation optical system, the detection element receives light emanated from the observation optical system, the processing device determines light quantity of the light received with the detection element, and the drive control device changes an interval between the sample and the objective lens on the basis of the light quantity such that the light quantity becomes minimum.

Figure 1:
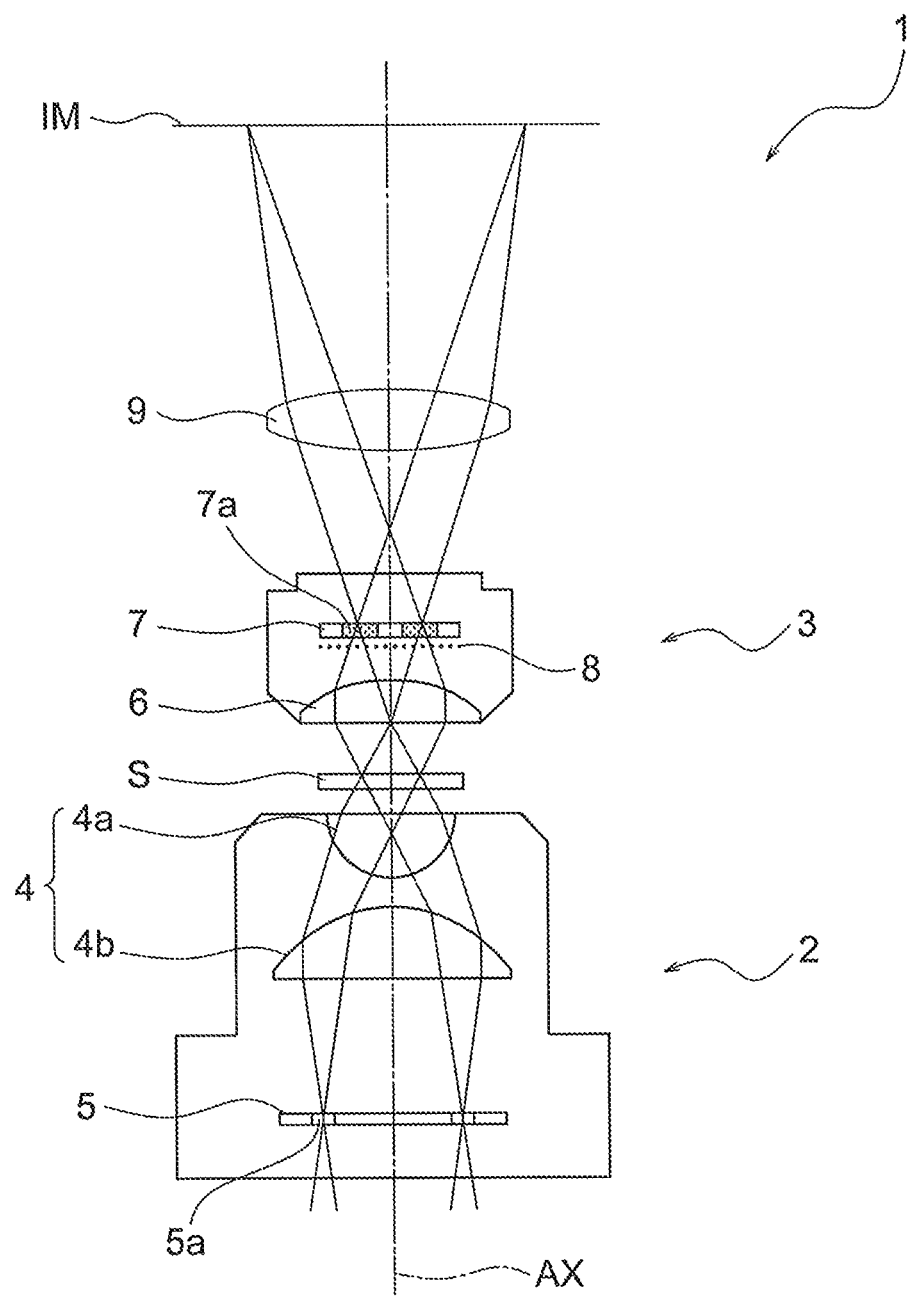
FIG. 1 is a diagram illustrating a main structure of a sample observation device according to an embodiment.

The following is an explanation of a focusing principle of a sample observation device having a focusing function according to the present embodiment (hereinafter referred to as "sample observation device according to the present embodiment"). FIG. 1 is a diagram illustrating a main structure of the sample observation device according to the present embodiment.

A sample observation device 1 is, for example, an upright microscope, and includes an illumination optical system 2 and an observation optical system 3. The sample observation device 1 further includes a light source, a detection element, a processing device, and a drive control device. In FIG. 1, the light source, the detection element, the processing device, or the drive control device are not illustrated. The light source, the detection element, the processing device, and the drive control device are illustrated in the sample observation device described later.

The illumination optical system 2 includes a condenser lens 4 and an aperture member 5. The condenser lens 4 includes a lens 4a and a lens 4b. The observation optical system 3 includes an objective lens 6 and a light attenuation member 7. The structure of the aperture member 5 and the structure of the light attenuation member 7 will be described later.

Objective lenses include infinity correction objective lenses and finite correction objective lenses. In infinity correction objective lenses, an image of a sample is not formed with the infinity correction objective lenses alone. An imaging lens is used to form an image of the sample. The objective lens 6 is an infinity correction objective lens. For this reason, the observation optical system 3 includes an imaging lens 9. When the objective lens 6 is a finite correction objective lens, the imaging lens 9 may be used or omitted.

The aperture member 5 is disposed at a pupil position of the illumination optical system 2. More specifically, the aperture member 5 is disposed at a pupil position of the condenser lens 4, that is, a focal position of the condenser lens 4. The aperture member 5 may be disposed at a position conjugate with the pupil of the illumination optical system 2. Accordingly, the aperture member 5 may be disposed at a position conjugate with the pupil of the condenser lens 4.

The aperture member 5 includes an aperture region 5a. An image of the light source is formed at the position of the aperture member 5. For this reason, divergent light is emanated from each point of the aperture region 5a. The divergent light is converted into parallel light beams with the condenser lens 4. As a result, the sample S is irradiated with illumination light of the parallel light beams. As described above, illumination light is irradiated from the illumination optical system 2 to the sample S.

The aperture region 5a is positioned not to include the optical axis AX. Accordingly, the illumination light irradiated to the sample S includes no parallel beams parallel with the optical axis. Specifically, the sample S is illuminated with only parallel beams crossing the optical axis AX.

By illuminating the sample S, image formation light is emanated from the sample S. The image formation light is made incident on the observation optical system 3. The following is an explanation of image formation light emanated from a point of the sample S. In this case, divergent light is made incident on the objective lens 6. The divergent light made incident on the objective lens 6 is condensed by the objective lens 6 and the imaging lens 9 on an image surface IM. Accordingly, an image of the sample S is formed on the image surface IM.

The following is an explanation of the image formation light emitted from a wide range of the sample S. The sample S is illuminated with parallel light beams. For this reason, parallel light beams are made incident on the objective lens 6. The parallel light beams made incident on the objective lens 6 are condensed with the objective lens 6. The light condensed with the objective lens 6 is made incident on the imaging lens 9 while diverging. The light emanated from the imaging lens 9 reaches the image surface IM.

The light attenuation member 7 is positioned in the condensing position of the parallel light beams. The light attenuation member 7 includes a light attenuation region 7a. The parallel light beams are condensed in the position of the light attenuation region 7a. Divergent light emanated from each point of the aperture region 5a is condensed with the condenser lens 4 and the objective lens 6. Accordingly, the condensing point of the light attenuation region 7a is an image of the emanated point of the aperture region 5a.

This means that the light attenuation region 7a is conjugate with the aperture region 5a. As described above, in the sample observation device 1, the light attenuation member 7 is disposed at a position conjugate with the aperture member 5. Accordingly, an image 8 of the aperture region is formed in the position of the light attenuation member 7.

In FIG. 1, the image 8 of the aperture region is illustrated in a position slightly apart from the light attenuation member 7. This illustration is made to clarify the position of the image 8 of the aperture region. Actually, the position of the image 8 of the aperture region coincides with the position of the light attenuation member 7.

As described above, the objective lens 6 is an infinity correction objective lens. In this case, the condensing position of the parallel light beams is the pupil of the objective lens 6. Accordingly, the light attenuation member 7 is disposed at the pupil position of the objective lens 6.

The aperture member 5 is disposed at the pupil position of the condenser lens 4. The light attenuation member 7 is disposed at the pupil position of the objective lens 6. In addition, the light attenuation member 7 is disposed at a position conjugate with the aperture member 5. Accordingly, in the sample observation device 1, the condenser lens 4 and the objective lens 6 are positioned such that the pupil of the condenser lens 4 is conjugate with the pupil of the objective lens 6.

In the sample observation device 1, the observation optical system 3 is formed of the objective lens 6 and the imaging lens 9. In this case, it is possible to regard the pupil position of the objective lens 6 as the pupil position of the observation optical system 3. Accordingly, in the sample observation device 1, the light attenuation member 7 is disposed at the pupil position of the observation optical system 3. The light attenuation member 7 may be disposed at a position conjugate with the pupil of the objective lens 6. Specifically, the light attenuation member 7 may be disposed at a position conjugate with the pupil of the observation optical system 3.

The aperture member 5 includes the aperture region 5a. The aperture region 5a is a region through which illumination light passes as it is. The expression "as it is" means a state in which light attenuation or light shielding hardly occurs. The aperture region 5a has an annular shape.

It is possible to use an opaque plate or a colorless and transparent plate for the aperture member 5. Examples of the opaque plate include a metal plate and/or an opaque resin plate. Examples of the colorless and transparent plate include a glass plate and/or a transparent resin plate.

In the case of using an opaque plate, a through hole may be formed in the opaque plate. In this case, the through hole serves as the aperture region 5a.

In the case of using a colorless and transparent plate, light-shielding paint may be applied to part of the colorless and transparent plate. By application of such paint, a region provided with the light-shielding paint and a region provided with no light-shielding paint are formed. In this case, the region provided with no light-shielding paint serves as the aperture region 5a.

The light attenuation member 7 includes the light attenuation region 7a. The light attenuation region 7a is a region through which the image formation light is attenuated and passes. The light attenuation region 7a has an annular shape.

Light attenuation is performed only by reflection, only by absorption, or by both reflection and absorption. In light attenuation by reflection, for example, a dielectric multi-layer film filter may be used. In light attenuation by absorption, for example, a color glass filter or an absorptive ND filter may be used.

In a dielectric multi-layer film filter, a multi-layer film is formed on a surface of a colorless and transparent member. In a dielectric multi-layer film filter, reflectivity property (or transmissivity property) depends on the structure (such as thickness of thin films, material of thin films, and the total number of thin films) of the multi-layer film. In a color glass filter, absorptivity depends on a density of the color coloring the colorless and transparent member. In an absorptive ND filter, absorptivity depends on absorption action of the substrate.

An opaque plate or a colorless and transparent plate may be used for the light attenuation member 7. Examples of the opaque plate and the colorless and transparent plate are the same as those described above.

In the case of using an opaque plate, a through hole may be formed in the opaque plate. In this case, the through hole serves as the aperture region 7a. However, it is necessary to perform light attenuation with the through hole.

In the case of performing light attenuation by reflection with the through hole, a dielectric multi-layer film may be formed on a colorless and transparent plate and the colorless and transparent plate may be positioned in the through hole. In the case of performing light attenuation by absorption with the through hole, a color glass may be positioned in the through hole.

In the case of using a colorless and transparent plate, the light attenuation region 7a may be formed in part of the colorless and transparent plate.

In the case of performing light attenuation by reflection, a dielectric multi-layer film may be formed in part of the colorless and transparent plate. With this structure, a region provided with a dielectric multi-layer film and a region provided with no dielectric multi-layer film are formed. The region provided with a dielectric multi-layer film serves as the light attenuation region 7a.

In the case of performing light attenuation by absorption, a color glass may be placed on part of the colorless and transparent plate. As another example, part of the colorless and transparent plate may be replaced with a color glass. With this structure, a region in which a color glass exists and a region in which no color glass exists are formed. The region in which a color glass exists serves as the light attenuation region 7a.

As described above, the light attenuation region 7a is disposed at a position conjugate with the aperture region 5a. Accordingly, an image of the aperture region 5a is formed on the position of the light attenuation region 7a. In the sample observation device 1, the size of the aperture region 5a, the position of the aperture region 5a, the size of the light attenuation region 7a, and the position of the light attenuation region 7a are set such that a predetermined state occurs.

The predetermined state is a state in which the image of the aperture region 5a is positioned only at the light attenuation region 7a in a determination region. The determination region is a region including both the image of the aperture region 5a and the light attenuation region 7a.

The following is an explanation of the aperture region, the light attenuation region, the focusing position, the position of the sample, and the inclination of the sample surface. Suppose that the size of the light attenuation region and the position of the light attenuation region are determined in advance.

The following is an explanation of the sample. Examples of the sample include a living cell in a culture fluid. The shape of the living cell in a culture fluid can be simplified to a shape obtained by cutting part of a sphere with a plane (hereinafter referred to as "plano-convex shape"). In this case, it is possible to regard the sample with a plano-convex shape as a lens.

When a sample with a plano-convex shape is positioned between the illumination optical system and the observation optical system, the sample may function as a lens or does not function as a lens according to the position of the sample.

When the sample functions as a lens, the magnitude of the lens function changes according to the position of the sample.

This point will be explained hereinafter. In the following explanation, the illumination optical system, the observation optical system, and the sample with a plano-convex shape are replaced with a condenser lens, an objective lens, and a plano-convex lens, respectively. Each of the condenser lens, the objective lens, and the plano-convex lens is regarded as a thin lens.

The following is an explanation of the case where a sample with a plano-convex shape exists between the illumination optical system and the observation optical system. In this case, a plano-convex lens is positioned between the condenser lens and the objective lens. A composite focal length fcom of the objective lens and the plano-convex lens is expressed with the following expression (A):
where, $$fcom = (flen \times fob)/(flen + fob - d) \quad (A)$$

flen is a focal length of the plano-convex lens,
fob is a focal length of the objective lens, and
d is an interval between the objective lens and the plano-convex lens.

Figure 2:
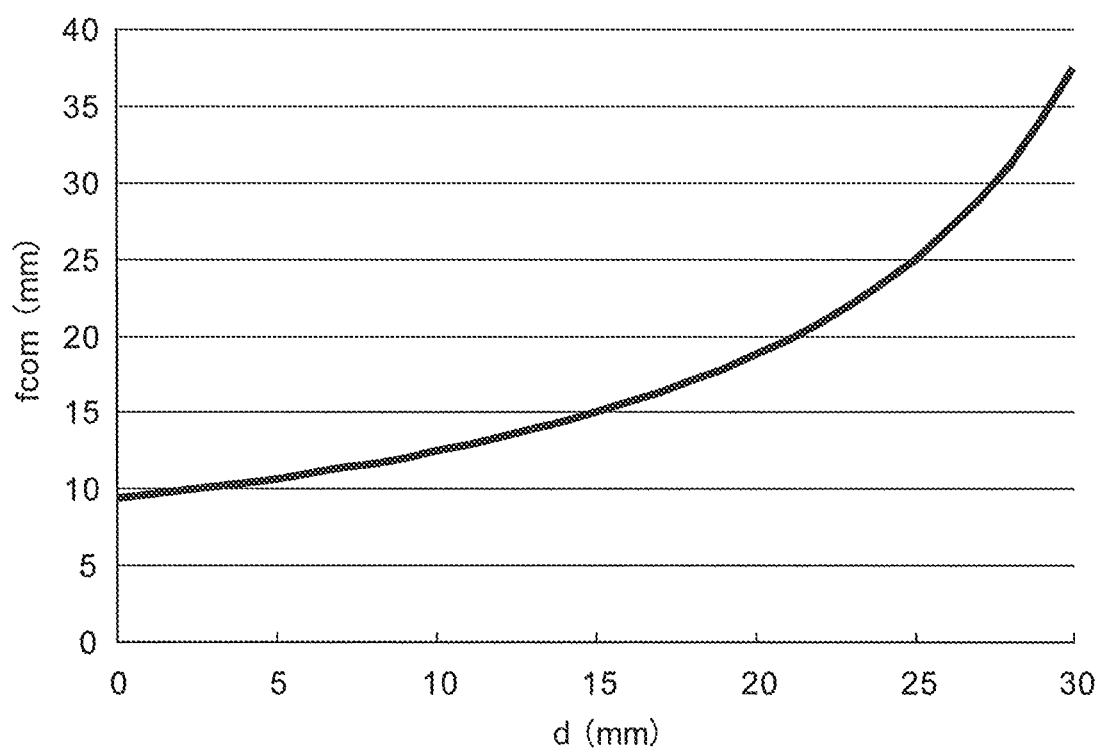
FIG. 2 is a graph illustrating relation between an interval between two lenses and a composite focal length.

FIG. 2 is a graph illustrating relation between the interval between the two lenses and the composite focal length. FIG. 2 illustrates the expression (A) with a graph. Here, a value of fob is 15 (mm) and a value of flen is 25 (mm).

In thin lenses, the focal length is a distance from a principal point to a focal position. The interval between the two thin lenses is a distance from the principal point of one of the lenses to the principal point of the other of the lenses.

As illustrated in FIG. 2, when the interval between the objective lens and the plano-convex lens is 15 mm, the composite focal length is 15 mm. Because the focal length of the objective lens is 15 mm, when the interval between the objective lens and the plano-convex lens is 15 mm, the composite focal length is equal to the focal length of the objective lens. This means that the plano-convex lens does not function as a lens when the interval between the objective lens and the plano-convex lens is 15 mm.

In an infinity correction objective lens, it is possible to replace the focusing position with a focal position. When the focal length of the objective lens is 15 mm, the position distant by 15 mm from the principal point of the objective lens serves as the focusing position. Accordingly, when the interval between the objective lens and the plano-convex lens is 15 mm, the plano-convex lens coincides with the focusing position of the objective lens.

As described above, when the interval between the objective lens and the plano-convex lens is 15 mm, the plano-convex lens does not function as a lens. Accordingly, in the state in which the plano-convex lens coincides with the focusing position of the objective lens, the plano-convex lens does not function as a lens.

When the interval between the objective lens and the plano-convex lens is smaller than 15 mm, the composite focal length is shorter than the focal length of the objective lens. When the interval between the objective lens and the plano-convex lens is larger than 15 mm, the composite focal length is longer than the focal length of the objective lens. These mean that the plano-convex lens functions as a lens.

When the interval between the objective lens and the plano-convex lens is smaller than 15 mm or when the interval between the objective lens and the plano-convex lens is larger than 15 mm, it means that the plano-convex lens does not coincide with the focusing position of the objective lens.

As described above, when the interval between the objective lens and the plano-convex lens is smaller than 15 mm or when the interval between the objective lens and the plano-convex lens is larger than 15 mm, the plano-convex lens functions as a lens. Accordingly, in the state in which the plano-convex lens does not coincide with the focusing position of the objective lens, the plano-convex lens functions as a lens.

The following is an explanation of the case where no lens exists between the illumination optical system and the observation optical system. In this case, no plano-convex lens is positioned between the condenser lens and the objective lens. The pupil magnification in this case is equal to the transverse magnification of the optical system formed of the condenser lens and the objective lens. The pupil magnification $\beta$ is expressed with the following expression (B):
where, $$\beta = fob/fc \quad (B)$$

fob is a focal length of the objective lens, and
fc is a focal length of the condenser lens.

When a plano-convex lens exists between the illumination optical system and the observation optical system, the pupil magnification is equal to the transverse magnification of the optical system formed of the condenser lens, the objective lens, and the plano-convex lens. The pupil magnification $\beta'$ is expressed with the following expression (C).
where, $$\beta' = fcom/fc = \{(flen \times fob)/(flen + fob - d)\}/fc = (flen \times fob)/\{fc \times (flen + fob - d)\} = \beta \times \beta p$$

$$\beta p = flen/(flen + fob - d), \text{ and} \quad (C)$$

$\beta p$ is the rate of change of the pupil magnification.

In the state in which the plano-convex lens coincides with the focusing position of the objective lens, the composite focal length is equal to the focal length of the objective lens. In this case, $\beta'$ is equal to $\beta$. Accordingly, "$\beta p=1$" is satisfied.

$$fcom/fc = fob/fc$$

$$\beta' = \beta$$

In the state in which the plano-convex lens does not coincide with the focusing position of the objective lens, the composite focal length is shorter than or longer than the focal length of the objective lens.

When the composite focal length is shorter than the focal length of the objective lens, $\beta'$ is smaller than $\beta$. Accordingly, "$\beta p<1$" is satisfied.

$$fcom/fc < fob/fc$$

$$\beta' < \beta$$

When the composite focal length is longer than the focal length of the objective lens, $\beta'$ is larger than $\beta$. Accordingly, "$\beta p>1$" is satisfied.

$$fcom/fc > fob/fc$$

$$\alpha' > \beta$$

As described above, the image 8 of the aperture region is formed in the position of the light attenuation member 7. The image 8 of the aperture region is formed through the condenser lens, the plano-convex lens (sample), and the objective lens. Accordingly, the size of the image 8 of the aperture region depends on the transverse magnification of the optical system formed of the condenser lens, the plano-convex lens (sample), and the objective lens, that is, β'.

β' is the product of β and βp. Because β is a constant, the size of the image 8 of the aperture region depends on βp.

βp differs according to degree of coincidence between the plano-convex lens and the focusing position of the objective lens. The degree of coincidence can be expressed with a shift quantity between the focusing position of the objective lens and the position of the plano-convex lens. Moreover, the objective lens can be replaced with the observation optical system, and the plano-convex lens can be replaced with the sample. Accordingly, βp differs according to the shift quantity between the focusing position of the observation optical system and the position of the sample.

Because the size of the image 8 of the aperture region depends on βp, the size of the image 8 of the aperture region depends on the shift quantity between the focusing position of the observation optical system and the position of the sample. The following is an explanation of change in size and change in position of the image 8 of the aperture region using the shift quantity between the focusing position of the observation optical system and the position of the sample.

The position of the image of the aperture region changes according to the inclination of the sample surface of the sample. The following is an explanation of the case where the sample surface is flat and the case where the sample surface is inclined. With respect to the case where the sample surface is inclined, the following is an explanation of the case where inclination of the sample surface is small and the case where inclination of the sample surface is large.

In the case where the shift quantity is zero, the position of the sample coincides with the focusing position of the observation optical system. When the shift quantity is not zero, the position of the sample does not coincide with the focusing position of the observation optical system. In the following explanation, the case where the shift quantity is zero is referred to as "in-focus state", and the case where the shift quantity is not zero is referred to as "out-of-focus state". The out-of-focus state includes a first out-of-focus state and a second out-of-focus state.

In the in-focus state, the sample does not function as a plano-convex lens. For this reason, βp is 1. In the out-of-focus state, the sample functions as a plano-convex lens. For this reason, βp is smaller than 1 or larger than 1.

Figure 3A:
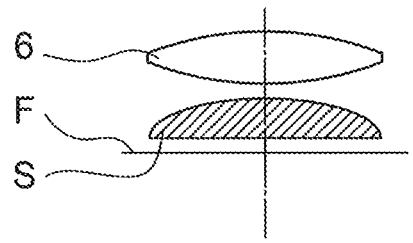
FIG. 3A, FIG. 3B, FIG. 3C, FIG. 3D, FIG. 3E, FIG. 3F, FIG. 3G, FIG. 3H, and FIG. 3I are diagrams illustrating relation between the focusing position and the position of the sample, and diagrams illustrating relation between an image of an aperture region and a light attenuation region.
Figure 3B:
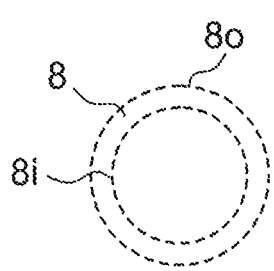
Figure 3C:
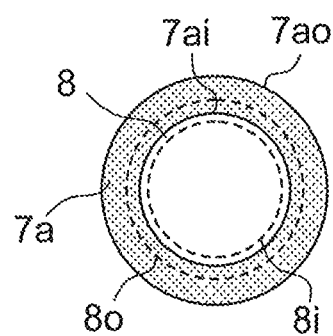
Figure 3D:
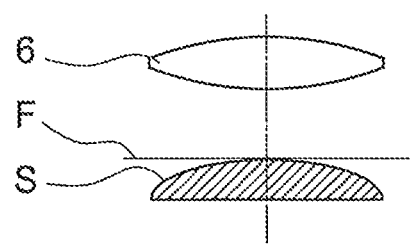
Figure 3E:
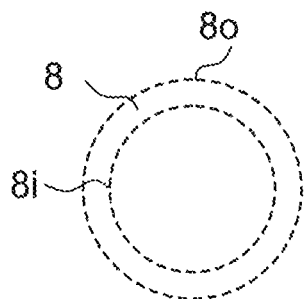
Figure 3F:
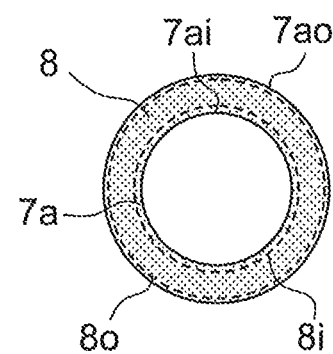
Figure 3G:
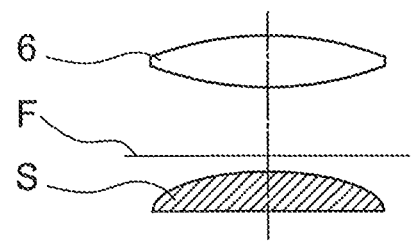
Figure 3H:
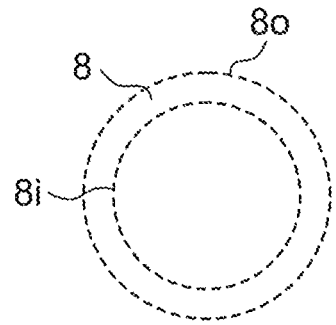
Figure 3I:
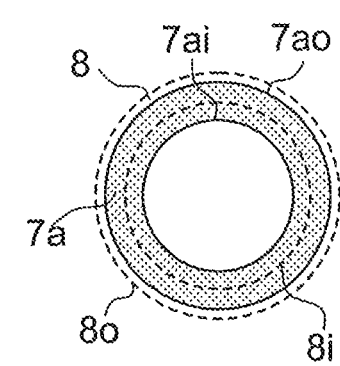

The following is an explanation of the state in which the sample surface is flat. FIG. 3A, FIG. 3D, and FIG. 3G are diagrams illustrating relation between the focusing position and the position of the sample, FIG. 3B, FIG. 3E, and FIG. 3H are diagrams illustrating the image of the aperture region, and FIG. 3C, FIG. 3F, and FIG. 3I are diagrams illustrating relation between the image of the aperture region and the light attenuation region. In the following explanation, the in-focus state, the first out-of-focus state, and the second out-of-focus state will be explained in this order. The focusing position of the objective lens is used as the focusing position of the observation optical system.

Diagrams illustrating the in-focus state are FIG. 3D, FIG. 3E, and FIG. 3F.

FIG. 3D is a diagram illustrating relation between the focusing position F and the position of the sample S. In the in-focus state, because the shift quantity is zero, the position of the sample S coincides with the focusing position F. In the in-focus state, "βp=1" is satisfied.

FIG. 3E is a diagram illustrating the image 8 of the aperture region in the in-focus state. The image 8 of the aperture region has an annular shape.

FIG. 3F is a diagram illustrating the image 8 of the aperture region and the light attenuation region 7a in the in-focus state. The light attenuation region 7a has an annular shape. The shape of the image 8 of the aperture region is the same as the shape of the light attenuation region 7a.

The whole annulus indicating the image 8 of the aperture region is superimposed on the annulus indicating the light attenuation region 7a. As described above, the determination region is "a region including both the image of the aperture region and the light attenuation region". Accordingly, the determination region ranges from an inner edge 7ai of the light attenuation region to an outer edge 7ao of the light attenuation region.

Both an inner edge 8i of the image of the aperture region and an outer edge 8o of the image of the aperture region are positioned between the inner edge 7ai of the light attenuation region and the outer edge 7ao if the light attenuation region. Accordingly, the image 8 of the aperture region is positioned only in the area of the light attenuation region 7a.

As described above, the predetermined state is "a state in which the image of the aperture region is positioned only in the area of the light attenuation region in the determination region". Accordingly, the in-focus state in the sample with a flat sample surface corresponds to the predetermined state.

Diagrams illustrating the first out-of-focus state are FIG. 3A, FIG. 3B, and FIG. 3C.

FIG. 3A is a diagram illustrating relation between the focusing position F and the position of the sample S. In the first out-of-focus state, because the shift quantity is not zero, the position of the sample S does not coincide with the focusing position F. The distance from the objective lens 6 to the sample S is shorter than the distance from the objective lens 6 to the focusing position F. In the first out-of-focus state, βp is smaller than 1.

FIG. 3B is a diagram illustrating the image 8 of the aperture region in the first out-of-focus state. The image 8 of the aperture region has an annular shape. In the first out-of-focus state, βp is smaller than 1. Accordingly, the size of the image 8 of the aperture region in the first out-of-focus state is smaller than the size of the image 8 of the aperture region in the in-focus state.

FIG. 3C is a diagram illustrating the image 8 of the aperture region and the light attenuation region 7a in the first out-of-focus state. The light attenuation region 7a has an annular shape. The shape of the image 8 of the aperture region is the same as the shape of the light attenuation region 7a. However, the size of the image 8 of the aperture region is smaller than the size of the light attenuation region 7a.

Part of the annulus indicating the image 8 of the aperture region overlaps the annulus indicating the light attenuation region 7a. The determination region ranges from the inner edge 8i of the image of the aperture region to the outer edge 7ao of the light attenuation region.

The inner edge 8i of the image of the aperture region is positioned inner (on the optical axis side) than the inner edge 7ai of the light attenuation region. The outer edge 8o of the image of the aperture region is positioned between the inner edge 7ai of the light attenuation region and the outer edge 7ao of the light attenuation region.

As described above, in the first out-of-focus state, the image 8 of the aperture region is also positioned outside the area of the light attenuation region 7a, as well as inside the area of the light attenuation region 7a. Accordingly, the first out-of-focus state in the sample with a flat sample surface does not correspond to the predetermined state.

Diagrams illustrating the second out-of-focus state are FIG. 3G, FIG. 3H, and FIG. 3I.

FIG. 3G is a diagram illustrating relation between the focusing position F and the position of the sample S. In the second out-of-focus state, because the shift quantity is not zero, the position of the sample S does not coincide with the focusing position F. The distance from the objective lens 6 to the sample S is longer than the distance from the objective lens 6 to the focusing position F. In the second out-of-focus state, βp is larger than 1.

FIG. 3H is a diagram illustrating the image 8 of the aperture region in the second out-of-focus state. The image 8 of the aperture region has an annular shape. In the second out-of-focus state, βp is larger than 1. Accordingly, the size of the image 8 of the aperture region in the second out-of-focus state is larger than the size of the image 8 of the aperture region in the in-focus state.

FIG. 3I is a diagram illustrating the image 8 of the aperture region and the light attenuation region 7a in the second out-of-focus state. The light attenuation region 7a has an annular shape. The shape of the image 8 of the aperture region is the same as the shape of the light attenuation region 7a. However, the size of the image 8 of the aperture region is larger than the size of the light attenuation region 7a.

Part of the annulus indicating the image 8 of the aperture region overlaps the annulus indicating the light attenuation region 7a. The determination region ranges from the inner edge 7ai of the light attenuation region to the outer edge 8o of the image of the aperture region.

The inner edge 8i of the image of the aperture region is positioned between the inner edge 7ai of the light attenuation region and the outer edge 7ao of the light attenuation region. The outer edge 8o of the image of the aperture region is positioned outer than the outer edge 7ao of the light attenuation region.

As described above, in the second out-of-focus state, the image 8 of the aperture region is also positioned outside the area of the light attenuation region 7a, as well as inside the area of the light attenuation region 7a. Accordingly, the second out-of-focus state in the sample with a flat sample surface does not correspond to the predetermined state.

As described above, in the sample observation device 1, the predetermined state and a state not being the predetermined state occur according to the position of the sample S with respect to the focusing position F. In other words, in the sample observation device 1, the size of the aperture region, the position of the aperture region, the size of the light attenuation region, and the position of the light attenuation region are set to generate the predetermined state and a state not being the predetermined state.

In the in-focus state, as illustrated in FIG. 3F, the image 8 of the aperture region is positioned only inside the area of the light attenuation region 7a. However, in FIG. 3F, a space is generated between the inner edge 8i of the image of the aperture region and the inner edge 7ai of the light attenuation region. In addition, a space is also generated between the outer edge 8o of the image of the aperture region and the outer edge 7ao of the light attenuation region.

In this case, when the inner edge 8i of the image of the aperture region coincides with the inner edge 7ai of the light attenuation region, in the state in which the outer edge 8o of the image of the aperture region does not reach the outer edge 7ao of the light attenuation region, the image 8 of the aperture region is positioned only inside the area of the light attenuation region 7a.

In addition, when the outer edge 8o of the image of the aperture region coincides with the outer edge 7ao of the light attenuation region, in the state in which the inner edge 8i of the image of the aperture region does not reach the inner edge 7ai of the light attenuation region, the image 8 of the aperture region is positioned only inside the area of the light attenuation region 7a.

The positions of the images 8 of the aperture regions in the two states described above are different from the position of the image 8 of the aperture region in the in-focus state. Accordingly, the two states described above are out-of-focus states. However, the image 8 of the aperture region is positioned only inside the area of the light attenuation region 7a. Accordingly, the two states described above correspond to the predetermined state, although the two state are out-of-focus states.

Because the two states described above are out-of-focus states, βp is not 1. However, βp in the two states described above is close to 1. As described above, in the case where the size of the image 8 of the aperture region is smaller than the size of the light attenuation region 7a, there are cases where the out-of-focus state corresponds to the predetermined state, when βp is close to 1.

In FIG. 3F, when the inner edge 8i of the image of the aperture region coincides with the inner edge 7ai of the light attenuation region and the outer edge 8o of the image of the aperture region coincides with the outer edge 7ao of the light attenuation region, the out-of-focus state does not correspond to the predetermined state, even when βp is close to 1.

In other words, when the size of the image of the aperture region is the same as the size of the light attenuation region and the position of the image of the aperture region coincides with the position of the light attenuation region, the out-of-focus state does not correspond to the predetermined state, even when βp is close to 1.

The following is an explanation of light passing through the light attenuation region 7a. It is possible to regard the light passing through the light attenuation region 7a as illumination light or image formation light as follows.

The aperture region is a region through which the illumination light passes. For this reason, it is possible to regard the image 8 of the aperture region as an image of the illumination light. Moreover, the light having passed through the aperture region passes through the sample S. The illumination light having passed through the sample S is emanated from the sample S, as the image formation light. Accordingly, it is possible to regard the image 8 of the aperture region as an image of the image formation light. The following is an explanation using the image formation light.

As described above, in the predetermined state, the image 8 of the aperture region is positioned only within the area of the light attenuation region 7a. For this reason, in the predetermined state, the whole image formation light passes through the light attenuation region 7a.

By contrast, in a state not being the predetermined state, the image 8 of the aperture region is positioned inside and outside the area of the light attenuation region 7a. For this reason, in this case, part of the image formation light passes through the light attenuation region 7a, and the rest of the image formation light does not pass through the light attenuation region 7a.

The light attenuation region is formed in the light attenuation member. The light attenuation member is also provided with a region (hereinafter referred to as "non-light-attenuation region") other than the light attenuation region. In a state not being the predetermined state, part of the image formation light passes through the light attenuation region, and the rest of the image formation light passes through the non-light-attenuation region.

The light transmissivity in the light attenuation region is smaller than the light transmissivity in the non-light-attenuation region. For this reason, supposing that the light quantity made incident on the light attenuation region is the same as the light quantity made incident on the non-light-attenuation region, the light quantity of light emanated from the light attenuation region is smaller than the intensity of the light emanated from the non-light-attenuation region.

As described above, in the predetermined state, the whole image formation light passes through the light attenuation region. By contrast, in a state not being the predetermined state, part of the image formation light passes through the light attenuation region, and the rest of the image formation light passes through the non-light-attenuation region. For this reason, the light quantity of the image formation light emanated from the light attenuation member in the predetermined state is smaller than the light quantity of the image formation light emanated from the light attenuation member in a state not being the predetermined state.

In a state not being the predetermined state, the range of the image formation light passing through the non-light-attenuation region changes according to the position of the sample with respect to the focusing position. Accordingly, the light quantity of the image formation light emanated from the light attenuation member changes according to the position of the sample with respect to the focusing position.

Figure 4A:
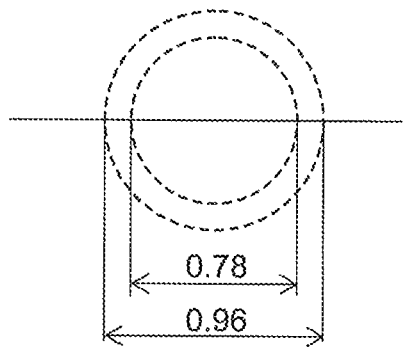
FIG. 4A, FIG. 4B, and FIG. 4C are diagrams illustrating the image of the aperture region, the light attenuation region, and a simulation result of the emanated light quantity.
Figure 4B:
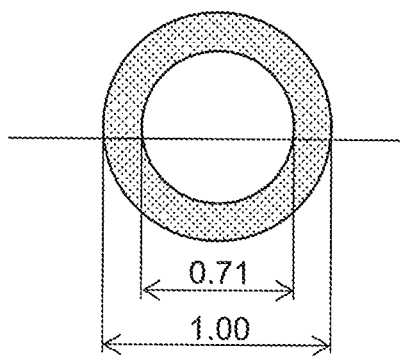
Figure 4C:
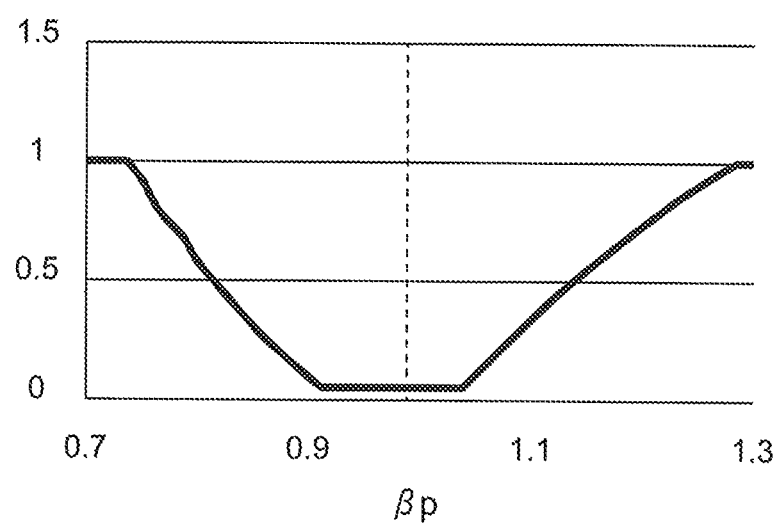

FIG. 4A, FIG. 4B, and FIG. 4C are diagrams illustrating the image of the aperture region, the light attenuation region, and a simulation result of the emanated light quantity. FIG. 4A is a diagram illustrating the image of the aperture region, FIG. 4B is a diagram illustrating the light attenuation region, and FIG. 4C is a graph illustrating emanated light quantity in the case where the sample surface is flat.

The light quantity (hereinafter referred to as "emanated light quantity") of the image formation light emanated from the light attenuation member is light quantity calculated by simulation. The horizontal axis indicates the pupil magnification, and the vertical axis indicates the emanated light quantity. As illustrated in FIG. 4A and FIG. 4B, in the simulation, each of the shape of the image of the aperture region and the shape of the light attenuation region is set to an annular shape.

With respect to the image of the aperture region, the diameter of the inner edge is set to 0.78, and the diameter of the outer edge is set to 0.96. With respect to the light attenuation region, the diameter of the inner edge is set to 0.71, and the diameter of the outer edge is set to 1.00. The value of each of the diameters is a value normalized with the diameter of the outer edge of the light attenuation region.

As illustrated in FIG. 4C, the emanated light quantity I changes according to the value of $\beta p$. The emanated light quantity I becomes minimum with the range of $\beta p$ from approximately 0.92 to approximately 1.05. This point will be described later.

With the range of $\beta p$ smaller than approximately 0.92, the emanated light quantity I increases as $\beta p$ decreases. Moreover, with the range of $\beta p$ larger than approximately 1.05, the emanated light quantity I increases as $\beta p$ increases.

When $\beta p$ is 1, the position of the sample coincides with the focusing position. When $\beta p$ is not 1, the position of the sample does not coincide with the focusing position. Accordingly, the horizontal axis of FIG. 4C indicates the shift quantity of the position of the sample with respect to the focusing position.

The position indicated with a broken line is a position when $\beta p$ is 1. The range in which the emanated light quantity I becomes minimum includes the state in which $\beta p$ is 1, that is, the state in which the position of the sample coincides with the focusing position. For this reason, it is possible to detect the state in which the position of the sample coincides with the focusing position, by detecting the range in which the emanated light quantity I becomes minimum.

As described above, in the case where the size of the image of the aperture region is smaller than the size of the light attenuation region, when $\beta p$ is close to 1, the state corresponds to the predetermined state even when the state is an out-of-focus state. In the predetermined state, the emanated light quantity I becomes minimum. For this reason, in such a case, the emanated light quantity becomes minimum when $\beta p$ is close to 1.

As illustrated in FIG. 4A and FIG. 4B, the diameter (0.78) of the inner edge of the image of the aperture region is larger than the diameter (0.71) of the inner edge of the light attenuation region. Moreover, the diameter (0.96) of the outer edge of the image of the aperture region is smaller than the diameter (1.00) of the outer edge of the light attenuation region.

For this reason, a space is generated between the inner edge of the image of the aperture region and the inner edge of the light attenuation region, and between the outer edge of the image of the aperture region and the outer edge of the light attenuation region. As described above, the simulation in FIG. 4C is performed in the state in which the size of the image of the aperture region is smaller than the size of the light attenuation region. For this reason, the emanated light quantity becomes minimum with the range of $\beta p$ from approximately 0.92 to approximately 1.05.

It is possible to perform detection of the range in which the emanated light quantity becomes minimum, that is, detection of the state in which the position of the sample coincides with the focusing position, with the detection element, the processing device, and the drive control device.

In observation of a sample and/or image pickup of the sample, the sample is placed on a stage. Generally, at a point in time when the sample is placed first, the position of the sample does not coincide with the focusing position. For this reason, the image of the sample is unclear. To acquire a clear image of the sample, it is required to make the position of the sample to coincide with the focusing position.

To change the state in which the position of the sample does not coincide with the focusing position to the state in which the position of the sample coincides with the focusing position, the relative position of the position of the sample and the focusing position may be changed. Change of the relative position of the position of the sample and the focusing position is generated by changing the interval between the sample and the objective lens.

The sample observation device 1 includes a drive control device. For this reason, it is possible to change the interval between the sample and the objective lens with the drive control device.

When the interval between the sample and the objective lens is changed, the emanated light quantity changes. It is possible to recognize change of emanated light quantity with the detection element and the processing device.

The detection element is disposed at the position of the image surface IM. The detection element receives light emanated from the observation optical system. The image formation light emanated from the light attenuation member is light emanated from the observation optical system. Accordingly, the image formation light is received with the detection element.

The light quantity of the light (image formation light) received with the detection element is determined with the processing device. Because the emanated light is light received with the detection element, it is possible to determine the emanated light quantity with the processing device. It is possible to recognize change of emanated light quantity by determining the emanated light quantity. It is possible to detect the minimum value of the emanated light quantity by recognizing change of the emanated light quantity.

The drive control device changes the interval between the sample and the objective lens such that the light quantity determined with the processing device becomes minimum, on the basis of the light quantity determined with the processing device.

The minimum value of the emanated light quantity indicates the state in which the position of the sample coincides with the focusing position. Accordingly, the interval between the sample and the objective lens is changed such that the emanated light quantity becomes minimum, on the basis of the emanated light quantity. In this manner, it is possible to determine the state in which the position of the sample coincides with the focusing position, that is, to determine the focusing position.

The following is an explanation of the case where the sample surface is inclined. In the case where the sample surface is inclined, shift occurs between the position of the image of the aperture region and the position of the light attenuation region. In the following explanation, suppose that the image of the aperture region is shifted rightward with respect to the light attenuation region. The left-and-right direction is the horizontal direction in the paper.

The determination region is determined with the range of the up-and-down direction and the range of the left-and-right direction. However, no shift in the up-and-down direction occurs between the position of the image of the aperture region and the position of the light attenuation region. For this reason, in the explanation of the determination region, an explanation of the range of the up-and-down direction is omitted, and the determination region is explained using only the left-and-right direction.

Figure 5A:
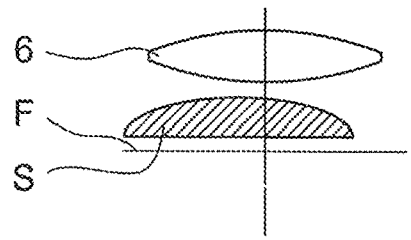
FIG. 5A, FIG. 5B, FIG. 5C, FIG. 5D, FIG. 5E, FIG. 5F, FIG. 5G, FIG. 5H, and FIG. 5I are diagrams illustrating relation between the focusing position and the position of the sample, and diagrams illustrating relation between the image of the aperture region and the light attenuation region.
Figure 5B:
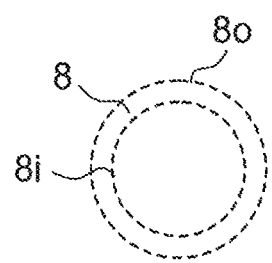
Figure 5C:
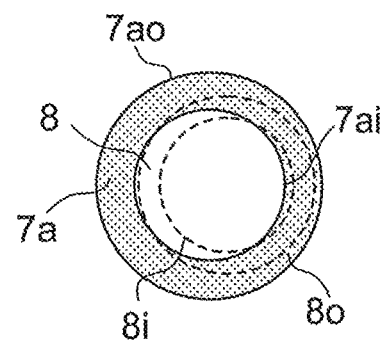
Figure 5D:
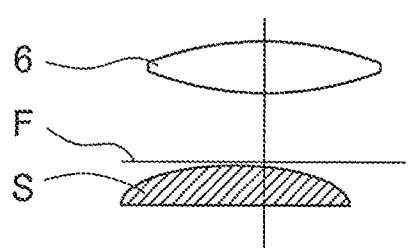
Figure 5E:
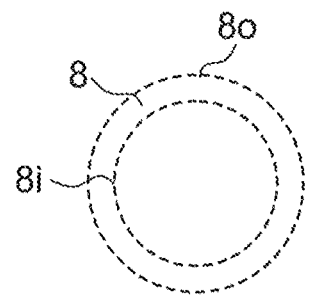
Figure 5F:
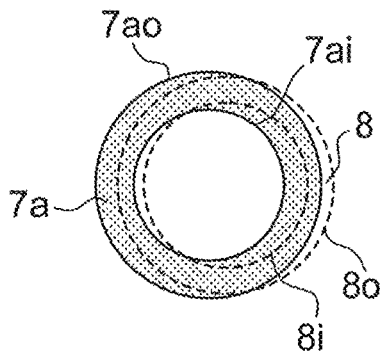
Figure 5G:
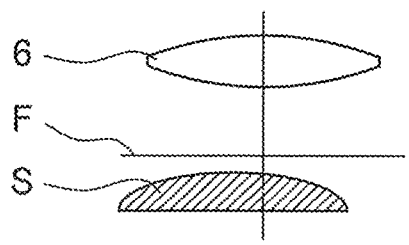
Figure 5H:
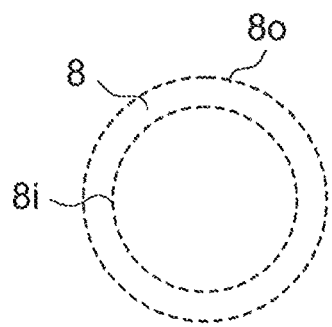
Figure 5I:
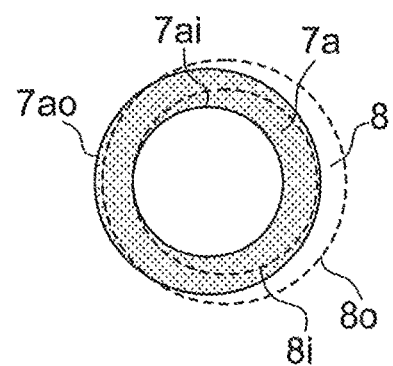

The following is an explanation of the case where inclination of the sample surface is small. FIG. 5A, FIG. 5D, and FIG. 5G are diagrams illustrating relation between the focusing position and the position of the sample, FIG. 5B, FIG. 5E, and FIG. 5H are diagrams illustrating the image of the aperture region, and FIG. 5C, FIG. 5F, and FIG. 5I are diagrams illustrating relation between the image of the aperture region and the light attenuation region. In the following explanation, the in-focus state, the first out-of-focus state, and the second out-of-focus state will be explained in this order.

Diagrams illustrating the in-focus state are FIG. 5D, FIG. 5E, and FIG. 5F.

FIG. 5D is a diagram illustrating relation between the focusing position F and the position of the sample S. In the in-focus state, because the shift quantity is zero, the position of the sample S coincides with the focusing position F. In the in-focus state, "βp=1" is satisfied.

FIG. 5E is a diagram illustrating the image 8 of the aperture region in the in-focus state. The image 8 of the aperture region has an annular shape.

FIG. 5F is a diagram illustrating the image 8 of the aperture region and the light attenuation region 7a in the in-focus state. The light attenuation region 7a has an annular shape. The shape of the image 8 of the aperture region is the same as the shape of the light attenuation region 7a.

When the sample surface is inclined, the emanating direction of the image formation light emanated from the sample S is different from that in the case where the sample surface is flat. For this reason, the whole annulus indicating the image 8 of the aperture region is not superimposed on the annulus indicating the light attenuation region 7a. Specifically, only part of the annulus indicating the image 8 of the aperture region overlaps the annulus indicating the light attenuation region 7a. The determination region ranges from the left end of the outer edge 7ao of the light attenuation region to the right end of the outer edge 8o of the image of the aperture region.

Part of the inner edge 8i of the image of the aperture region is positioned inner than the inner edge 7ai of the light attenuation region. Part of the outer edge 8o of the image of the aperture region is positioned outer than the outer edge 7ao of the light attenuation region.

As described above, in the in-focus state, the image 8 of the aperture region is positioned also outside the area of the light attenuation region 7a, as well as inside the area of the light attenuation region 7a. Accordingly, the in-focus state in the sample with an inclined sample surface does not correspond to the predetermined state.

Diagrams illustrating the first out-of-focus state are FIG. 5A, FIG. 5B, and FIG. 5C.

FIG. 5A is a diagram illustrating relation between the focusing position F and the position of the sample S. In the first out-of-focus state, because the shift quantity is not zero, the position of the sample S does not coincide with the focusing position F. The distance from the objective lens 6 to the sample S is shorter than the distance from the objective lens 6 to the focusing position F. In the first out-of-focus state, βp is smaller than 1.

FIG. 5B is a diagram illustrating the image 8 of the aperture region in the first out-of-focus state. The image 8 of the aperture region has an annular shape. In the first out-of-focus state, βp is smaller than 1. Accordingly, the size of the image 8 of the aperture region in the first out-of-focus state is smaller than the size of the image 8 of the aperture region in the in-focus state.

FIG. 5C is a diagram illustrating the image 8 of the aperture region and the light attenuation region 7a in the first out-of-focus state. The light attenuation region 7a has an annular shape. The shape of the image 8 of the aperture region is the same as the shape of the light attenuation region 7a. However, the size of the image 8 of the aperture region is smaller than the size of the light attenuation region 7a.

Part of the annulus indicating the image 8 of the aperture region overlaps the annulus indicating the light attenuation region 7a. The determination region is positioned inner than the outer edge 7ao of the light attenuation region.

Part of the inner edge 8i of the image of the aperture region and part of the outer edge 8o of the image of the aperture region are positioned inner than the inner edge 7ai of the light attenuation region.

As described above, in the first out-of-focus state, the image 8 of the aperture region is also positioned outside the area of the light attenuation region 7a, as well as inside the area of the light attenuation region 7a. Accordingly, the first out-of-focus state in the sample with an inclined sample surface does not correspond to the predetermined state.

Diagrams illustrating the second out-of-focus state are FIG. 5G, FIG. 5H, and FIG. 5I.

FIG. 5G is a diagram illustrating relation between the focusing position F and the position of the sample S. In the second out-of-focus state, because the shift quantity is not zero, the position of the sample S does not coincide with the focusing position F. The distance from the objective lens 6 to the sample S is longer than the distance from the objective lens 6 to the focusing position F. In the second out-of-focus state, βp is larger than 1.

FIG. 5H is a diagram illustrating the image 8 of the aperture region in the second out-of-focus state. The image 8 of the aperture region has an annular shape. In the second out-of-focus state, βp is larger than 1. Accordingly, the size of the image 8 of the aperture region in the second out-of-focus state is larger than the size of the image 8 of the aperture region in the in-focus state.

FIG. 5I is a diagram illustrating the image 8 of the aperture region and the light attenuation region 7a in the second out-of-focus state. The light attenuation region 7a has an annular shape. The shape of the image 8 of the aperture region is the same as the shape of the light attenuation region 7a. However, the size of the image 8 of the aperture region is larger than the size of the light attenuation region 7a.

Part of the annulus indicating the image 8 of the aperture region overlaps the annulus indicating the light attenuation region 7a. The determination region ranges from the left end of the outer edge 7ao of the light attenuation region to the right end of the outer edge 8o of the image of the aperture region.

The inner edge 8i of the image of the aperture region is positioned between the inner edge 7ai of the light attenuation region and the outer edge 7ao of the light attenuation region. Part of the outer edge 8o of the image of the aperture region is positioned outer than the outer edge 7ao of the light attenuation region.

As described above, in the second out-of-focus state, the image 8 of the aperture region is also positioned outside the area of the light attenuation region 7a, as well as inside the area of the light attenuation region 7a. Accordingly, the second out-of-focus state in the sample with an inclined sample surface does not correspond to the predetermined state.

In the case where the sample surface is inclined, each of the in-focus state, the first out-of-focus state, and the second out-of-focus state does not correspond to the predetermined state. Part of the image formation light passes through the light attenuation region, and the rest of the image formation light passes through the non-light-attenuation region.

As described above, the range of the image formation light passing through the non-light-attenuation region changes according to the position of the sample with respect to the focusing position. Accordingly, the light quantity of the image formation light emanated from the light attenuation member changes according to the position of the sample with respect to the focusing position.

Figure 6:
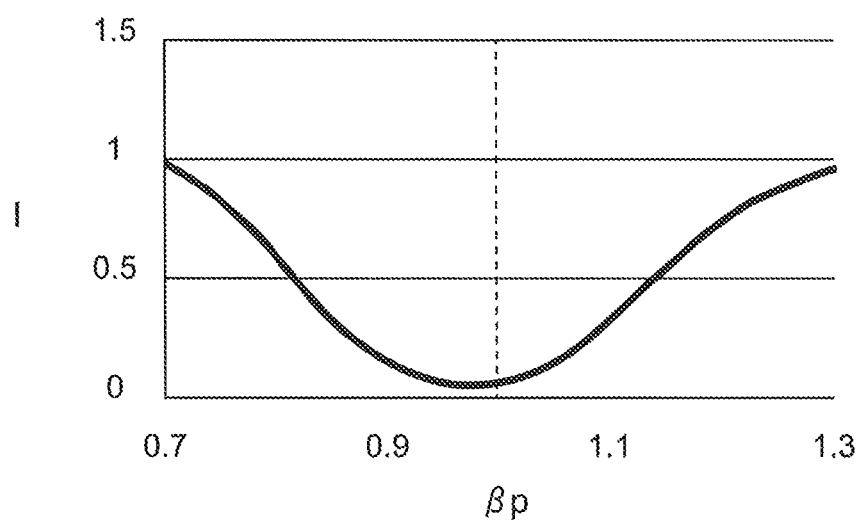
FIG. 6 is a graph illustrating emanated light quantity in the case where the sample surface is slightly inclined.

FIG. 6 is a graph illustrating the emanated light quantity in the case where the sample surface is slightly inclined. The emanated light quantity is light quantity calculated by simulation. The image of the aperture region and the light attenuation region used for simulation are the same as those of the simulation performed with the sample with a flat sample surface.

The emanated light quantity I becomes minimum in a range in which βp is close to 1, that is, βp is slightly smaller than 1. In ranges other than a range in which βp is close to 1, the emanated light quantity I increases as βp decreases, or the emanated light quantity I increases as βp increases.

The position indicated with a broken line is a position when βp is 1. The range in which the emanated light quantity I becomes minimum includes the state in which βp is 1, that is, the state in which the position of the sample coincides with the focusing position. For this reason, it is possible to detect the state in which the position of the sample coincides with the focusing position, by detecting the range in which the emanated light quantity I becomes minimum.

When the graph illustrated in FIG. 6 is compared with the graph illustrated in FIG. 4C, the shapes of the graphs are different in a range in which βp is close to 1.

As described above, in the case where the sample surface is flat, in the in-focus state, a space is generated between the inner edge of the image of the aperture region and the inner edge of the light attenuation region, and between the outer edge of the image of the aperture region and the outer edge of the light attenuation region. By contrast, in the case where inclination of the sample surface is small, no such space is generated even in the in-focus state.

For this reason, in the case where inclination of the sample surface is small, the emanated light quantity I starts to change in a part in which βp is closer to 1 in comparison with the case where the sample surface is flat. For this reason, the shape of the graph in the range in which βp is close to 1 differs between FIG. 4C and FIG. 6.

Moreover, in the case where inclination of the sample surface is small, even in the in-focus state, part of the image of the aperture region is positioned outside the area of the light attenuation region 7a. However, the proportion of the image of the aperture region positioned outside the area of the light attenuation region is small. For this reason, the minimum light quantity is not very different in comparison with the case where the sample surface is flat.

Figure 7A:
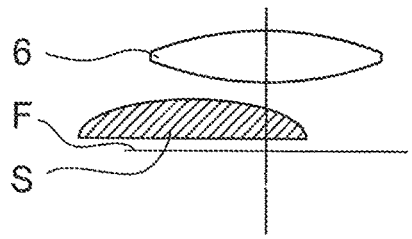
FIG. 7A, FIG. 7B, FIG. 7C, FIG. 7D, FIG. 7E, FIG. 7F, FIG. 7G, FIG. 7H, and FIG. 7I are diagrams illustrating relation between the focusing position and the position of the sample, and diagrams illustrating relation between the image of the aperture region and the light attenuation region.
Figure 7B:
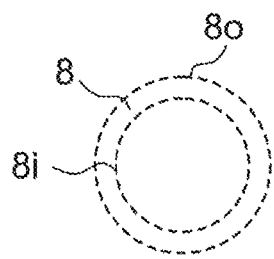

The following is an explanation of the case where inclination of the sample surface is large. FIG. 7A, FIG. 7D, and FIG. 7G are diagrams illustrating relation between the focusing position and the position of the sample, FIG. 7B, FIG. 7E, and FIG. 7H are diagrams illustrating the image of the aperture region, and FIG. 75C, FIG. 7F, and FIG. 7I are diagrams illustrating relation between the image of the aperture region and the light attenuation region. In FIGS. 7A to 7I, the sample surface is inclined significantly in comparison with FIGS. 5A to 5I. In the following explanation, the in-focus state, the first out-of-focus state, and the second out-of-focus state will be explained in this order.

Diagrams illustrating the in-focus state are FIG. 7D, FIG. 7E, and FIG. 7F.

FIG. 7D is a diagram illustrating relation between the focusing position F and the position of the sample S. In the in-focus state, because the shift quantity is zero, the position of the sample S coincides with the focusing position F. In the in-focus state, "βp=1" is satisfied.

FIG. 7E is a diagram illustrating the image 8 of the aperture region in the in-focus state. The image 8 of the aperture region has an annular shape.

FIG. 7F is a diagram illustrating the image 8 of the aperture region and the light attenuation region 7a in the in-focus state. The light attenuation region 7a has an annular shape. The shape of the image 8 of the aperture region is the same as the shape of the light attenuation region 7a.

As described above, when the sample surface is inclined, the emanating direction of the image formation light emanated from the sample S is different from that in the case where the sample surface is flat. For this reason, the whole annulus indicating the image 8 of the aperture region is not superimposed on the annulus indicating the light attenuation region 7a. Specifically, only part of the annulus indicating the image 8 of the aperture region overlaps the annulus indicating the light attenuation region 7a. The determination region ranges from the left end of the outer edge 7ao of the light attenuation region to the right end of the outer edge 8o of the image of the aperture region.

Part of the inner edge 8i of the image of the aperture region is positioned inner than the inner edge 7ai of the light attenuation region. Part of the outer edge 8o of the image of the aperture region is positioned outer than the outer edge 7ao of the light attenuation region.

As described above, in the in-focus state, the image 8 of the aperture region is positioned also outside the area of the light attenuation region 7a, as well as inside the area of the light attenuation region 7a. Accordingly, the in-focus state in the sample with an inclined sample surface does not correspond to the predetermined state.

Figure 7C:
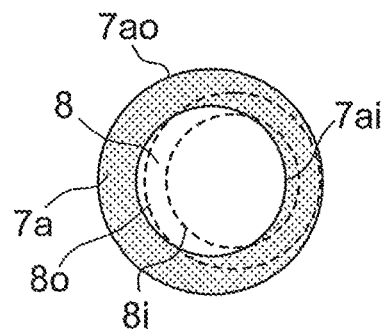
Figure 7D:
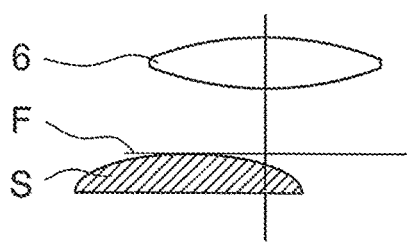
Figure 7E:
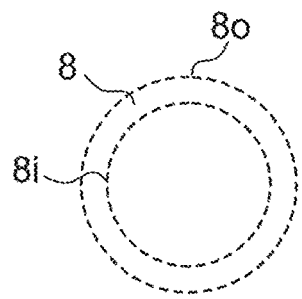
Figure 7F:
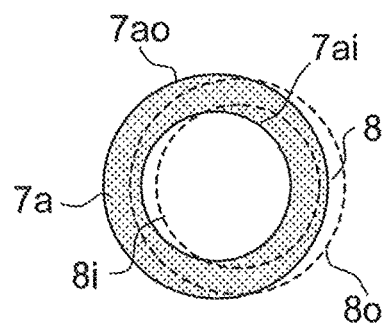
Figure 7G:
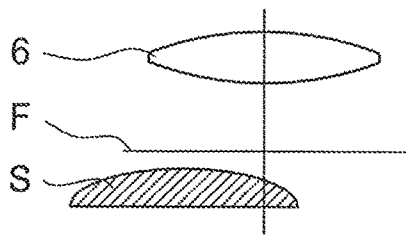
Figure 7H:
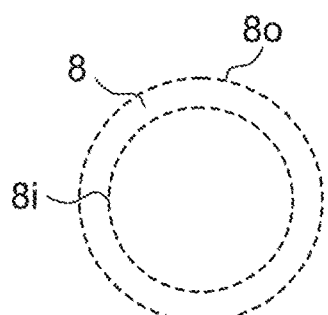
Figure 7I:
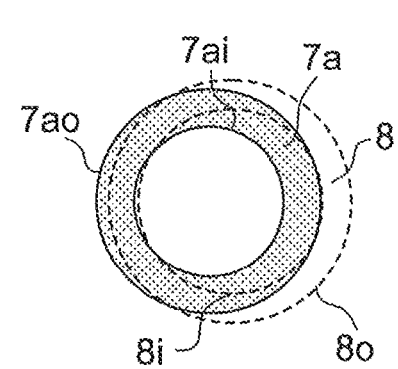

Diagrams illustrating the first out-of-focus state are FIG. 7A, FIG. 7B, and FIG. 7C.

FIG. 7A is a diagram illustrating relation between the focusing position F and the position of the sample S. In the first out-of-focus state, because the shift quantity is not zero, the position of the sample S does not coincide with the focusing position F. The distance from the objective lens 6 to the sample S is shorter than the distance from the objective lens 6 to the focusing position F. In the first out-of-focus state, βp is smaller than 1.

FIG. 7B is a diagram illustrating the image 8 of the aperture region in the first out-of-focus state. The image 8 of the aperture region has an annular shape. In the first out-of-focus state, βp is smaller than 1. Accordingly, the size of the image 8 of the aperture region in the first out-of-focus state is smaller than the size of the image 8 of the aperture region in the in-focus state.

FIG. 7C is a diagram illustrating the image 8 of the aperture region and the light attenuation region 7a in the first out-of-focus state. The light attenuation region 7a has an annular shape. The shape of the image 8 of the aperture region is the same as the shape of the light attenuation region 7a. However, the size of the image 8 of the aperture region is smaller than the size of the light attenuation region 7a.

Part of the annulus indicating the image 8 of the aperture region overlaps the annulus indicating the light attenuation region 7a. The determination region is positioned inner than the outer edge 7ao of the light attenuation region.

Part of the inner edge 8i of the image of the aperture region and part of the outer edge 8o of the image of the aperture region are positioned inner than the inner edge 7ai of the light attenuation region.

As described above, in the first out-of-focus state, the image 8 of the aperture region is also positioned outside the area of the light attenuation region 7a, as well as inside the area of the light attenuation region 7a. Accordingly, the first out-of-focus state in the sample with an inclined sample surface does not correspond to the predetermined state.

Diagrams illustrating the second out-of-focus state are FIG. 7G, FIG. 7H, and FIG. 7I.

FIG. 7G is a diagram illustrating relation between the focusing position F and the position of the sample S. In the second out-of-focus state, because the shift quantity is not zero, the position of the sample S does not coincide with the focusing position F. The distance from the objective lens 6 to the sample S is longer than the distance from the objective lens 6 to the focusing position F. In the second out-of-focus state, βp is larger than 1.

FIG. 7H is a diagram illustrating the image 8 of the aperture region in the second out-of-focus state. The image 8 of the aperture region has an annular shape. In the second out-of-focus state, βp is larger than 1. Accordingly, the size of the image 8 of the aperture region in the second out-of-focus state is larger than the size of the image 8 of the aperture region in the in-focus state.

FIG. 7I is a diagram illustrating the image 8 of the aperture region and the light attenuation region 7a in the second out-of-focus state. The light attenuation region 7a has an annular shape. The shape of the image 8 of the aperture region is the same as the shape of the light attenuation region 7a. However, the size of the image 8 of the aperture region is larger than the size of the light attenuation region 7a.

Part of the annulus indicating the image 8 of the aperture region overlaps the annulus indicating the light attenuation region 7a. The determination region ranges from the left end of the outer edge 7ao of the light attenuation region to the right end of the outer edge 8o of the image of the aperture region.

Part of the inner edge 8i of the image of the aperture region is positioned inner than the inner edge 7ai of the light attenuation region and outer than the outer edge 7ao of the light attenuation region. Part of the outer edge 8o of the image of the aperture region is positioned outer than the outer edge 7ao of the light attenuation region.

As described above, in the second out-of-focus state, the image 8 of the aperture region is also positioned outside the area of the light attenuation region 7a, as well as inside the area of the light attenuation region 7a. Accordingly, the second out-of-focus state in the sample with an inclined sample surface does not correspond to the predetermined state.

In the case where the sample surface is inclined, each of the in-focus state, the first out-of-focus state, and the second out-of-focus state does not correspond to the predetermined state. Part of the image formation light passes through the light attenuation region, and the rest of the image formation light passes through the non-light-attenuation region.

As described above, the range of the image formation light passing through the non-light-attenuation region changes according to the position of the sample with respect to the focusing position. Accordingly, the light quantity of the image formation light emanated from the light attenuation member changes according to the position of the sample with respect to the focusing position.

Figure 8:
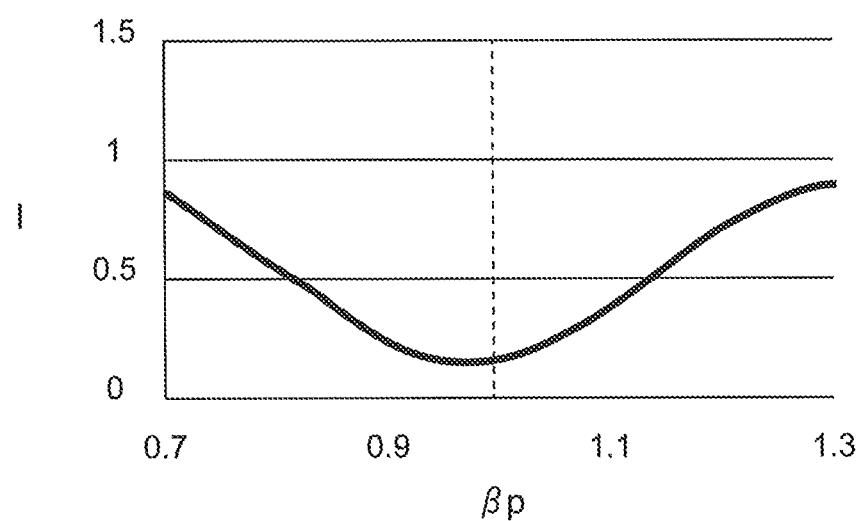
FIG. 8 is a graph illustrating emanated light quantity in the case where the sample surface is inclined significantly.

FIG. 8 is a graph illustrating the emanated light quantity in the case where the sample surface is inclined large. The emanated light quantity is light quantity calculated by simulation. The image of the aperture region and the light attenuation region used for simulation are the same as those of the simulation performed with the sample with a flat sample surface.

The emanated light quantity I becomes minimum in a range in which βp is close to 1, that is, βp is slightly smaller than 1. In ranges other than a range in which βp is close to 1, the emanated light quantity I increases as βp decreases, or the emanated light quantity I increases as βp increases.

The position indicated with a broken line is a position when βp is 1. The range in which the emanated light quantity I becomes minimum includes the state in which βp is 1, that is, the state in which the position of the sample coincides with the focusing position. For this reason, it is possible to detect the state in which the position of the sample coincides with the focusing position, by detecting the range in which the emanated light quantity I becomes minimum.

When the graph illustrated in FIG. 8 is compared with the graph illustrated in FIG. 4C and the graph illustrated in FIG. 6, the shapes of the graphs are different in a range in which βp is close to 1. This point is the same as that explained in the case where inclination of the sample surface is small.

However, in the case where inclination of the sample surface is large, the proportion of the image of the aperture region positioned outside the area of the light attenuation region is large in comparison with the case where inclination of the sample surface is small. For this reason, the minimum light quantity I is larger than that in the case where the sample surface is flat and that in the case where inclination of the sample surface is small.

The graph illustrated in FIG. 6 and the graph illustrated in FIG. 8 indicate the state in which focusing is more or less achieved in a position in which the emanated light quantity becomes minimum, both in the case where inclination of the sample surface is small and in the case where inclination of the sample surface is large. Accordingly, the interval between the sample and the objective lens is changed such that the emanated light quantity becomes minimum, on the basis of the emanated light quantity. In this manner, it is possible to determine the state in which the position of the sample coincides with the focusing position, that is, determine the focusing position.

As described above, according to sample observation device of the present embodiment, it is possible to determine the focusing position by changing the interval between the sample and the objective lens such that the emanated light quantity becomes minimum, regardless of presence/absence of inclination of the sample surface and degree of inclination.

In addition, in the sample observation device 1, information of all the pixels of the acquired image, that is, the whole light quantity of the light received with the detection element is used for detection of the in-focus state. In this case, even when the acquired image includes, for example, a bright region (hereinafter referred to as "region A") caused by dust or the like, the ratio of the proportion of the light quantity by the region A to the sum total of the light quantities is small. For this reason, the image is hardly influenced by the region A.

As a result, even when bright light occurs with dust or the like, it is possible to determine the state in which the position of the sample coincides with the focusing position, that is, determine the focusing position, by changing the interval between the sample and the objective lens on the basis of the emanated light quantity such that the emanated light quantity becomes minimum. As described above, according to the sample observation device 1, it is possible to detect the in-focus state, even when pixels having brightness causing an error in detection of the in-focus state are included in all the pixels used for detection of the in-focus state.

Figure 9A:
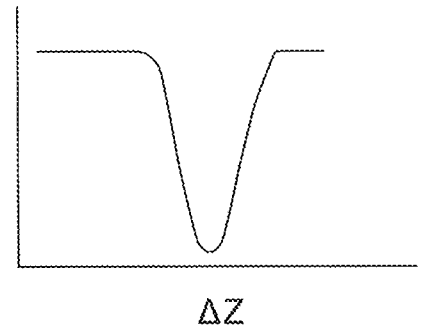
FIG. 9A, FIG. 9B, and FIG. 9C are graphs illustrating emanated light quantity.
Figure 9B:
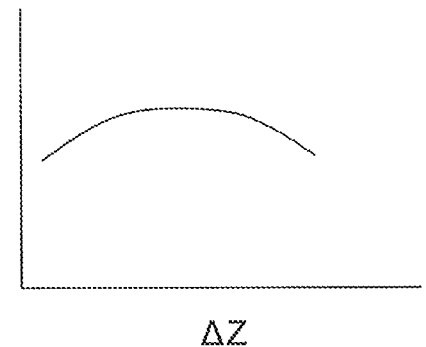
Figure 9C:
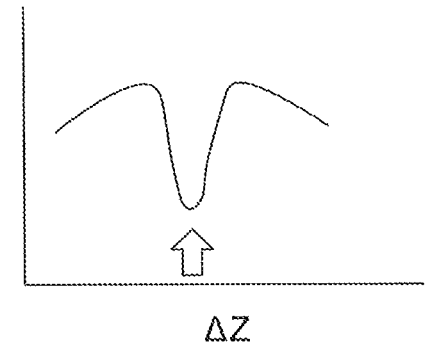

The following is a further explanation of the emanated light quantity. FIG. 9A, FIG. 9B, and FIG. 9C are graphs illustrating the emitted light quantity. The horizontal axis indicates the shift quantity ΔZ between the focusing position and the position of the sample, and the vertical axis indicates the emanated light quantity I.

FIG. 9A is a graph illustrating the emanated light quantity at a time when only the lens function occurs. FIG. 9B is a graph illustrating the emanated light quantity at a time when only the defocusing function occurs. FIG. 9C is a graph illustrating the emanated light quantity at a time when both the lens function and the defocusing function occur.

As described above, when the sample exists in the optical path, the magnitude of the lens function caused by the sample changes (including the case where no lens function occurs) according to the shift quantity ΔZ between the focusing position and the position of the sample. When the magnitude of the lens function changes, the value of βp changes. As a result, as illustrated in FIG. 9A, the emanated light quantity I changes. As described above, when the sample exists in the optical path, the emanated light quantity I changes according to change in shift quantity ΔZ between the focusing position and the position of the sample.

However, even in the case where no sample exists in the optical path, the shift quantity ΔZ between the focusing position and the position of the sample is related to the emanated light quantity I.

The shift quantity ΔZ between the focusing position and the position of the sample indicates the defocusing quantity. When the defocusing quantity is not zero, a defocusing function occurs. For this reason, when no sample exists in the optical path, although no lens function caused by the sample occurs, the magnitude of the defocusing function changes (including the case where no defocusing function occurs) according to the shift quantity ΔZ between the focusing position and the position of the sample.

When the magnitude of the defocusing function changes, the contrast of the image and the brightness of the whole image change. As a result, as illustrated in FIG. 9B, the emanated light quantity I changes. As described above, even when no sample exists in the optical path, the emanated light quantity I changes according to change in shift quantity ΔZ between the focusing position and the position of the sample.

In actual measurement, the lens function and the defocusing function simultaneously occur. For this reason, the emanated light quantity I changes as illustrated in the graphs of FIG. 9C.

Also in the graph illustrated in FIG. 9C, it is possible to recognize the state in which the emanated light quantity becomes minimum. Accordingly, according to the sample observation device of the present embodiment, it is possible to determine the focusing position by changing the interval between the sample and the objective lens such that the emanated light quantity becomes minimum.

Figure 10:
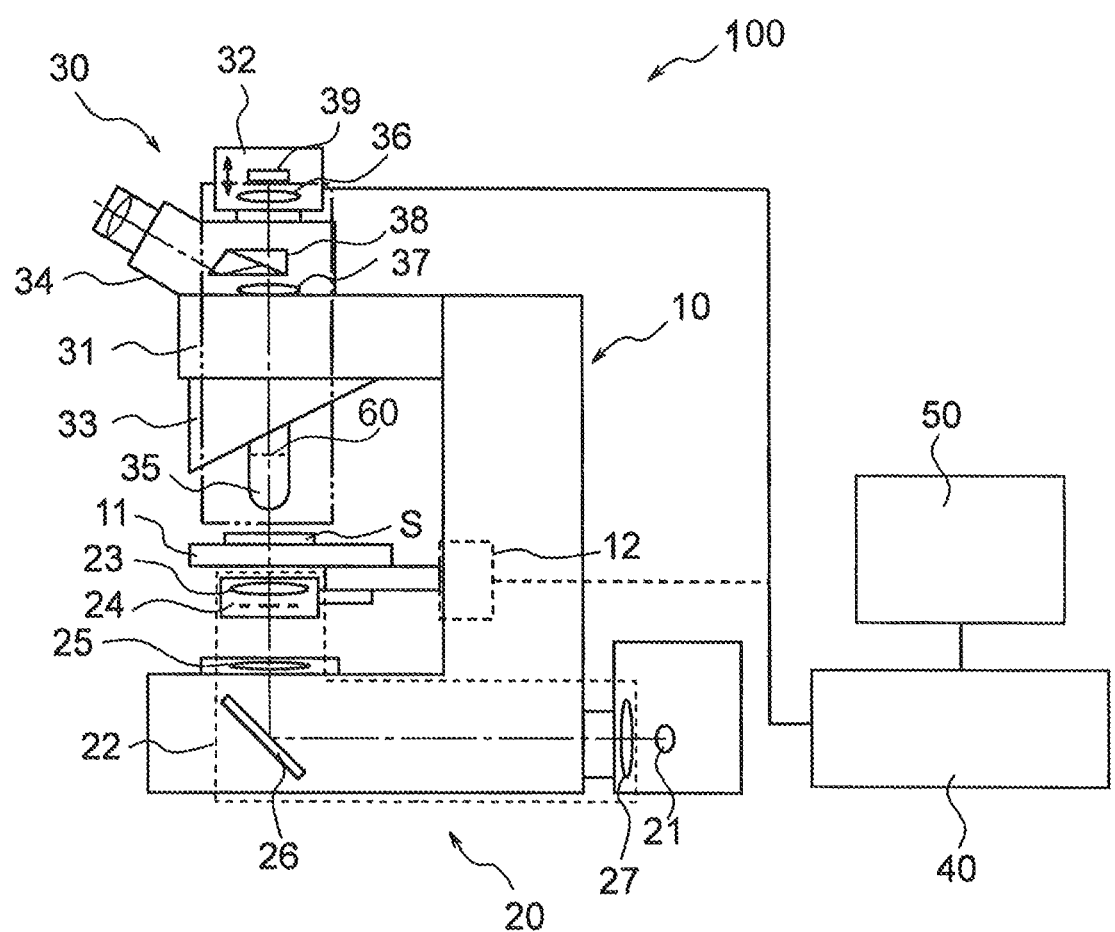
FIG. 10 is a diagram illustrating a specific example of the sample observation device according to the present embodiment.

The following is an explanation of a specific example of the sample observation device according to the present embodiment. FIG. 10 is a diagram illustrating a specific example of the sample observation device according to the present embodiment.

A sample observation device 100 is a device obtained by providing an upright microscope with a focusing function. The sample observation device 100 includes a main body unit 10, an illumination unit 20, an observation unit 30, and a processing device 40. The illumination unit 20 and the observation unit 30 are attached to the main body unit 10. The main body unit 10 and the processing device 40 are connected in a wired or wireless manner.

The sample observation device 100 may include a display device 50. The display device 50 is connected with the processing device 40 in a wired or wireless manner.

The main body unit 10 includes a stage 11. The stage 11 is a holding member. A sample S is placed on the stage 11. The sample S is moved with an operating knob (not illustrated) and/or a focusing knob (not illustrated). By operation of the operating knob, the sample S is moved in a plan perpendicular to the optical axis. By operation of the focusing knob, the sample S is moved along the optical axis.

The illumination unit 20 includes a light source 21 and an illumination optical system 22. The illumination optical system 22 includes a condenser lens 23 and an aperture member 24. As illustrated in FIG. 10, the illumination optical system 22 may include a lens 25, a mirror 26, and a lens 27. In FIG. 10, the condenser lens 23 and the aperture member 24 are held on the stage 11. The illumination optical system 22 is disposed in an optical path extending from the light source 21 to the stage 11.

The observation unit 30 includes an observation optical system 31 and an image pickup device 32. The observation unit 30 may include a revolver 33 and an observation lens barrel.

The observation optical system 31 includes a microscope objective lens 35, a light attenuation member 60, and an image pickup lens 36. The image pickup device 32 includes a detection element 39. For example, a photodiode is used for the detection element 39.

The light attenuation member 60 is disposed inside the microscope objective lens 35. The observation optical system 31 may include an imaging lens 37 and a prism 38. The observation optical system 31 is disposed in an optical path extending from the stage 11 to the image pickup device 32.

In the sample observation device 100, the illumination unit 20 is disposed on a side opposed to the observation unit 30 with the stage 11 interposed therebetween. For this reason, in the sample observation device 100, the sample S is illuminated with transmission illumination.

Illumination light is emitted from the light source 21. The illumination light passes through the illumination optical system 22, and reaches the stage 11. The sample S is illuminated with the illumination light. The light from the sample S is condensed with the observation optical system 31, and in this manner an image (optical image) of the sample S is formed in the condensing position.

When no prism 38 exists in the optical path of the observation optical system 31, the light emanated from the observation optical system 31 is received with the detection element 39. It is possible to determine, with the processing device 40, the light quantity of the light received with the detection element 39, that is, the emanated light quantity.

The sample observation device 100 includes the aperture member 24 and the light attenuation member 60. For this reason, the emanated light quantity gradually decreases as the state approaches the state in which the position of the sample S coincides with the focusing position from the state in which the position of the sample S does not coincide with the focusing position.

The emanated light quantity changes by changing the interval between the sample S and the microscope objective lens 35. For this reason, the interval between the sample S and the microscope objective lens 35 is changed by operating the focusing knob. In this manner, the emanated light quantity is changed. Change of emanated light quantity can be recognized with the detection element 39 and the processing device 40.

While change of the emanated light quantity is recognized, the focusing knob is operated such that the emanated light quantity becomes minimum. When the emanated light quantity becomes minimum, the operation with the focusing knob is ended.

The main body unit 10 may include a motor 12 (drive control device). In FIG. 10, the motor 12 is connected with the stage 11. By moving the stage 11 along the optical axis with the motor 12, it is possible to change the interval between the sample S and the microscope objective lens 35 without using the focusing knob. When the emanated light quantity becomes minimum, movement of the stage 11 is stopped.

As described above, according to the sample observation device 100, it is possible to determine the focusing position by changing the interval between the sample and the objective lens such that the emanated light quantity becomes minimum, regardless of presence/absence of inclination of the sample surface and/or the degree of inclination.

Figure 11A:
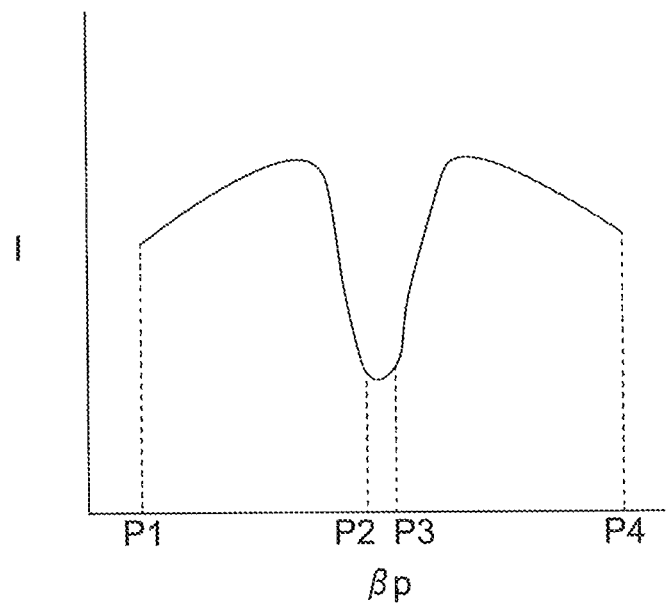
FIG. 11A and FIG. 11B are diagrams illustrating the emanated light quantity and the in-focus state.
Figure 11B:
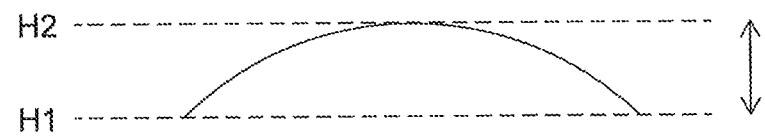

The following is an explanation of relation between the range in which the emanated light quantity becomes minimum and the in-focus state. FIG. 11A and FIG. 11B are diagrams illustrating the emitted light quantity and the in-focus state. FIG. 11A is a graph illustrating the emanated light quantity. FIG. 11B is a diagram illustrating relation between the position of the sample and the focusing position.

By changing the interval between the sample S and the microscope objective lens 35, the emanated light quantity changes as in the graph illustrated in FIG. 11A. In FIG. 11A, the emanated light quantity becomes substantially minimum in a range indicated with an arrow. Accordingly, the in-focus state exists within the range of the arrow. The reason why the emanated light quantity does not become minimum in one point is described above.

When the range indicated with the arrow is replaced with the interval between the sample S and the microscope objective lens 35, for example, the range is the range from H1 to H2 as illustrated in FIG. 11B. H1 is a bottom surface of the sample, and H2 is the top point of the sample.

As described above, in observation of the sample and/or image pickup of the sample, the sample is placed on the stage. Generally, at a point in time when the sample is placed first, the position of the sample does not coincide with the focusing position. For this reason, the image of the sample is unclear.

For this reason, the observer operates the focusing knob to move the sample S toward the focusing position. As another example, the stage 11 is moved with the motor 12 to move the sample S toward the focusing position.

When the position of the sample S is very close to the microscope objective lens 35, the stage 11 may be moved in a direction in which the sample S moves away from the microscope objective lens 35. By contrast, when the position of the sample S is very distant from the microscope objective lens 35, the stage 11 may be moved in a direction in which the sample S approaches the microscope objective lens 35.

In the state where the position of the sample S is very close to the microscope objective lens 35, because the defocusing quantity is large, the emanated light quantity is small, and βp is smaller than 1. This state corresponds to, for example, the position of P1.

From this state, when the sample S is moved in a direction of moving away from the microscope objective lens 35, the emanated light quantity gradually increases. Thereafter, the emanated light quantity gradually decreases. In the position of P2, the emanated light quantity becomes a state close to minimum. The focusing position in this state is the position of H1.

By contrast, in the state where the position of the sample S is very distant from the microscope objective lens 35, because the defocusing quantity is large, the emanated light quantity is small, and βp is larger than 1. This state corresponds to, for example, the position of P4.

From this state, when the sample S is moved in a direction of approaching the microscope objective lens 35, the emanated light quantity gradually increases. Thereafter, the emanated light quantity gradually decreases. In the position of P3, the emanated light quantity becomes a state close to minimum. The focusing position in this state is the position of H2.

As described above, in the sample observation device 100, it is possible to achieve focusing in the vicinity of the sample S by changing the interval between the sample S and the objective lens 6 such that the emanated light quantity becomes minimum. However, in the sample observation device 100, the position determined as the focusing position is a position between H1 and H2, as illustrated in FIG. 11B. For this reason, the sample observation device according to the present embodiment is suitable for focusing for coarse adjustment. In focusing for coarse adjustment, it is possible to achieve focusing in the vicinity of the sample S. For this reason, focusing for coarse adjustment is used for, for example, focusing performed at a time when the sample is placed first.

In the sample observation device 100, the prism 38 may be inserted into the optical path of the observation optical system 31. In this manner, light from the sample S is guided to the eyepiece of the observation lens barrel 34. The observer can observe an optical image of the sample S through the eyepiece.

In the explanation described above, each of the aperture region and the light attenuation region has an annular shape. However, the shape of the aperture region and the shape of the light attenuation region are not limited to annulus. In addition, the shape of the aperture region and the shape of the light attenuation region are not limited to the same shape or a similar shape.

Figure 12A:
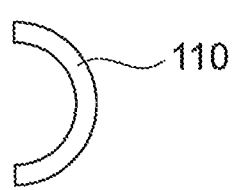
FIG. 12A, FIG. 12B, FIG. 12C, and FIG. 12D are diagrams illustrating the shape of the aperture region and the shape of the light attenuation region.
Figure 12B:
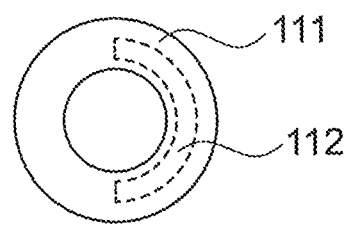
Figure 12C:
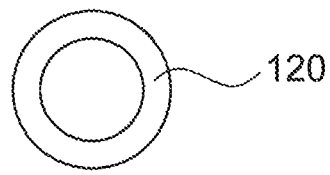
Figure 12D:
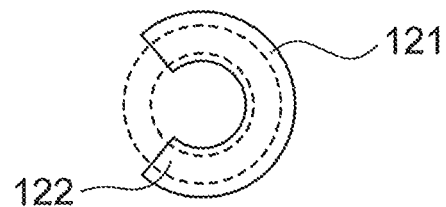

FIG. 12A, FIG. 12B, FIG. 12C, and FIG. 12D are diagrams illustrating the shape of the aperture region and the shape of the light attenuation region. The shape of the aperture region and the shape of the light attenuation region are different from each other. FIG. 12A is a diagram illustrating a first example of the shape of the aperture region, FIG. 12B is a diagram illustrating the first example of the shape of an image of the aperture region and the shape of the light attenuation region, FIG. 12C is a diagram illustrating a second example of the shape of the aperture region, and FIG. 12D is a diagram illustrating the second example of the shape of an image of the aperture region and the shape of the light attenuation region.

As illustrated in FIG. 12A, in the first example, the shape of an aperture region 110 is a shape of a halved annulus. Moreover, as illustrated in FIG. 12B, the shape of a light attenuation region 111 is annulus. The shape of an image 112 of the aperture region is a shape of a halved annulus.

In the first example, the light attenuation region 111 has an annular shape. For this reason, even when the aperture region 110 is rotated around the optical axis, it is possible to position the image 112 of the aperture region in the area of the light attenuation region 111.

As illustrated in FIG. 12C, in the second example, the shape of an aperture region 120 is annulus. Moreover, as illustrated in FIG. 12D, the shape of a light attenuation region 121 is a shape of a halved annulus. The shape of an image 122 of the aperture region is annulus.

In the second example, the shape of the light attenuation region 111 is a shape obtained by removing approximately ¼ of the annulus. In this case, because light passing through the non-light-attenuation region increases, a bright optical image is acquired. However, because change of the emanated light quantity decreases, it is preferable to increase the light attenuation region.

Figure 13A:
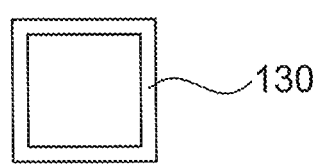
FIG. 13A, FIG. 13B, FIG. 13C, FIG. 13D, FIG. 13E, and FIG. 13F are diagrams illustrating the shape of the aperture region and the shape of the light attenuation region.
Figure 13B:
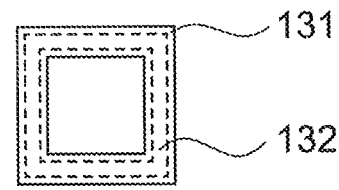
Figure 13C:
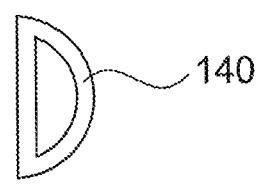
Figure 13D:
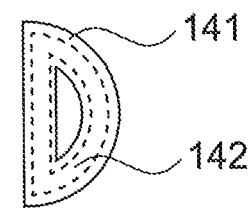
Figure 13E:
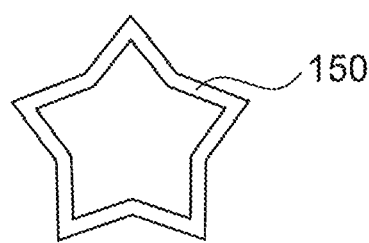
Figure 13F:
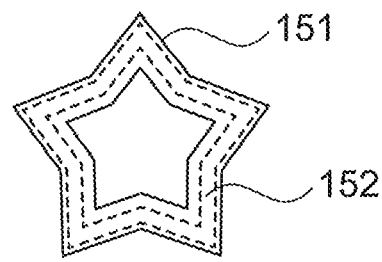

FIG. 13A, FIG. 13B, FIG. 13C, FIG. 13D, FIG. 13E, and FIG. 13F are diagrams illustrating the shape of the aperture region and the shape of the light attenuation region. The shape of the aperture region and the shape of the light attenuation region are the same shape. FIG. 13A is a diagram illustrating a third example of the shape of the aperture region, FIG. 13B is a diagram illustrating the third example of the shape of an image of the aperture region and the shape of the light attenuation region, FIG. 13C is a diagram illustrating a fourth example of the shape of the aperture region, FIG. 13D is a diagram illustrating the fourth example of the shape of an image of the aperture region and the shape of the light attenuation region, FIG. 13E is a diagram illustrating a fifth example of the shape of the aperture region, and FIG. 13F is a diagram illustrating the fifth example of the shape of an image of the aperture region and the shape of the light attenuation region, As illustrated in FIG. 13A, in the third example, the shape of an aperture region 130 is a square shape as a whole and in the form of frame. Moreover, as illustrated in FIG. 13B, each of the shape of a light attenuation region 131 and the shape of an image 132 of the aperture region is a square shape as a whole and in the form of frame.

As illustrated in FIG. 13C, in the fourth example, the shape of an aperture region 140 is a semicircular shape as a whole and in the form of frame. Moreover, as illustrated in FIG. 13D, each of the shape of a light attenuation region 141 and the shape of an image 142 of the aperture region is a semicircular shape as a whole and in the form of frame.

As illustrated in FIG. 13E, in the fifth example, the shape of an aperture region 150 is a star shape as a whole and in the form of frame. Moreover, as illustrated in FIG. 13F, each of the shape of a light attenuation region 151 and the shape of an image 152 of the aperture region is a star shape as a whole and in the form of frame.

In the sample observation device according to the present embodiment, it is preferable that the detection element include minute light receiving elements arranged in a two-dimensional manner.

In a CCD or a CMOS, minute light receiving elements are arranged in a two-dimensional manner. When a CCD or a CMOS is used as the detection element 39, the light quantity of light received with the detection element 39, that is, the emanated light quantity is the sum total of the light quantities of light received with the light receiving elements. For this reason, when a CCD or a CMOS is used as the detection element 39, it is possible to determine the focusing position by changing the interval between the sample and the objective lens such that the emanated light quantity becomes minimum, on the basis of the summed light quantities.

Determination of the focusing position may be performed with the mean value of the light quantities of light received with the light receiving elements. The mean value can be acquired by dividing the sum total of the light quantities of light received with the light receiving elements by the number of pixels.

Moreover, when a CCD or a CMOS is used as the detection element 39, it is possible to perform image pickup of an image of the sample S with the detection element 39. By image pickup, the image of the sample S is converted into an electronic image (digital data). The electronic image is transmitted to the processing device 40. Various types of processing are performed in the processing device 40.

When the sample observation device 100 includes the display device 50, the electronic image is displayed on the display device 50. The observer can observe the sample S (image of the sample S) by observing the electronic image displayed on the display device 50.

In the sample observation device according to the present embodiment, it is preferable that each of the shape of the aperture region and the shape of the light attenuation region be annulus.

In this manner, the aperture region and the light attenuation region have shapes rotationally symmetric with respect to the optical axis. For this reason, it is possible to easily determine the position of the aperture member and the position of the light attenuation region.

In the sample observation device according to the present embodiment, it is preferable that the following Conditional Expression (1) be satisfied:

$$ROBin < \beta \times RILin < \beta \times RILout < ROBout \quad (1)$$

where,

RILin is a distance from the optical axis of the illumination optical system to the inner edge of the aperture region, RILout is a distance from the optical axis of the illumination optical system to the outer edge of the aperture region, ROBin is a distance from the optical axis of the observation optical system to the inner edge of the light attenuation region, ROBout is a distance from the optical axis of the observation optical system to the outer edge of the light attenuation region, and β is a magnification obtained by dividing the focal length of the objective lens by the focal length of the condenser lens.

By satisfying the Conditional Expression (1), it is possible to determine the focusing position with high accuracy.

In the sample observation device according to the present embodiment, it is preferable that the light attenuation member include a phase region, and at least part of the phase region overlaps at least part of the light attenuation region.

Figure 14:
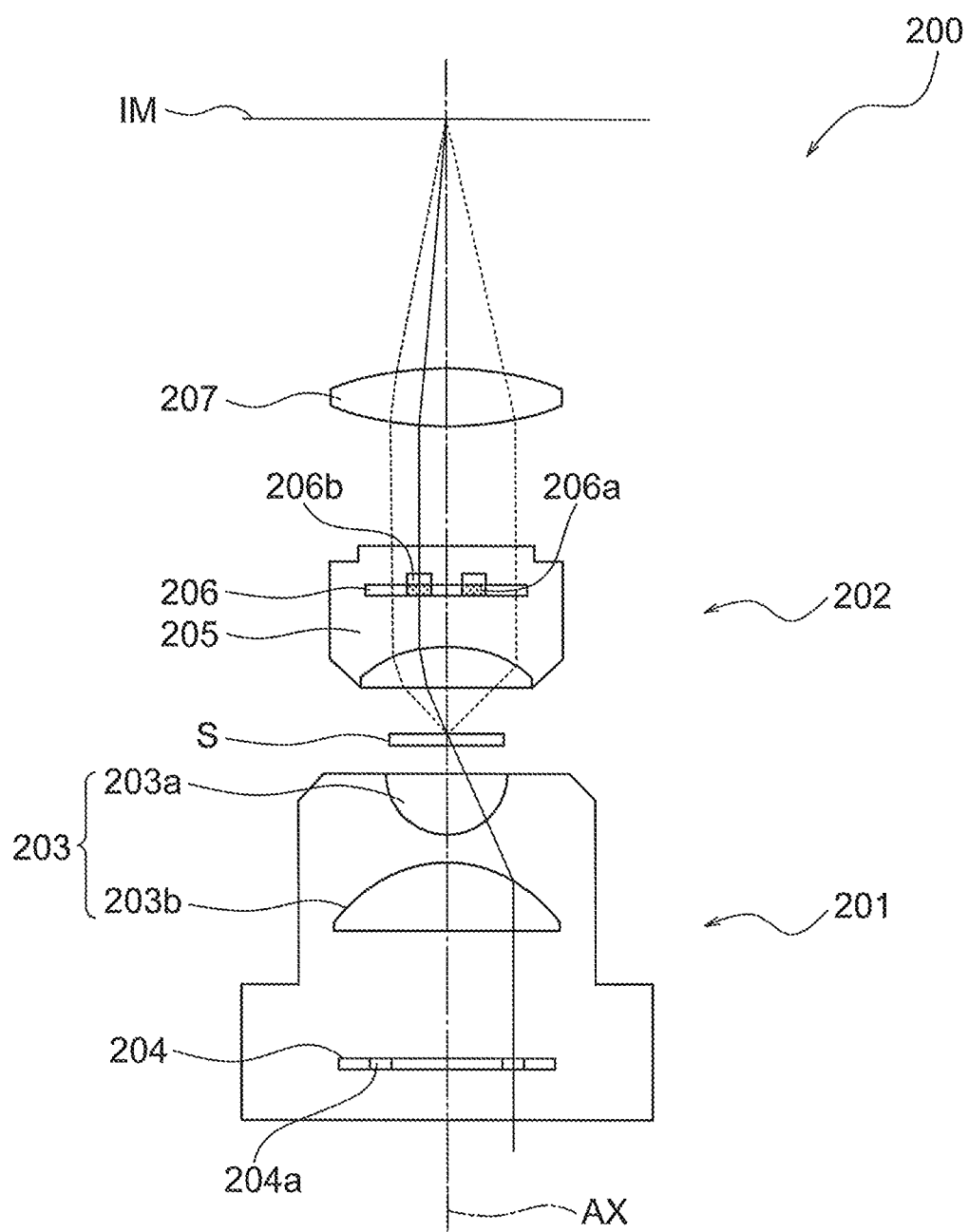
FIG. 14 is a diagram illustrating a diagram illustrating a main structure of another sample observation device according to the present embodiment.

FIG. 14 is a diagram illustrating a main structure of another sample observation device according to the present embodiment. The optical system of the sample observation device according to the present embodiment is an optical system capable of performing phase contrast observation.

A sample observation device 200 includes an illumination optical system 201 and an observation optical system 202. The sample observation device 200 further includes a light source, a detection element, a processing device, and a drive control device. In FIG. 14, the light source, the detection element, the processing device, and the drive control device are not illustrated.

The illumination optical system 201 includes a condenser lens 203 and an aperture member 204. The condenser lens 203 includes a lens 203a and a lens 203b. The observation optical system 202 includes an objective lens 205, a light attenuation member 206, and an imaging lens 207.

Each of the condenser lens 203 and the objective lens 205 is positioned such that the pupil of the condenser lens 203 is conjugate with the pupil of the objective lens 205.

The aperture member 204 is disposed at the pupil position of the illumination optical system 201. More specifically, the aperture member 204 is positioned at the pupil position of the condenser lens 203, that is, the focal position of the condenser lens 203.

The aperture member 204 includes an aperture region 204a. The structure of the aperture member 204 is the same as structure of the aperture member 5. For this reason, an explanation of the aperture member 204 is omitted. Moreover, in the sample observation device 200, the sample S is illuminated in the same manner as the sample observation device 1. For this reason, an explanation of illumination in the sample observation device 200 is omitted.

The light attenuation member 206 includes a light attenuation region 206a and a phase region 206b. The light attenuation region 206a is a region through which the image formation light is attenuated and passes. The phase region 206b is a region to modulate the phase of the image formation light.

Each of the light attenuation region 206a and the phase region 206b has an annular shape. The phase region 206b is disposed to be superimposed on the light attenuation region 206a. A phase plate is used in a microscope objective lens for phase contrast observation. The light attenuation member 206 is the same as the phase plate.

Also in the sample observation device 200, illumination light of parallel light beams is irradiated to the sample S. In FIG. 14, the illumination light is illustrated with one solid line. Zero-order image formation light (hereinafter referred to as "zero-order light") and ±first-order image formation light (hereinafter referred to as "first-order light") are emanated from the sample S. In FIG. 14, the zero-order light is illustrated with a solid line, and the first-order light is illustrated with broken lines.

Both the zero-order light and the first-order light are made incident on the light attenuation member 206. The zero-order light passes through the light attenuation region 206a, and the first-order light passes through the non-light-attenuation region. The zero-order light further passes through the phase region 206b.

By passage of the zero-order light through the phase region 206b, the phase of the zero-order light advances by a ¼ wavelength, or is delayed by a ¼ wavelength. By contrast, the phase of the first-order light does not change.

Before the light is incident on the light attenuation member 206, a shift of a ¼ wavelength exists between the phase of the zero-order light and the phase of the first-order light. By passage of the zero-order light through the phase region 206b, the difference between the phase of the zero-order light and the phase of the first-order light is changed to zero, or a ½ wavelength. As a result, it is possible to observe the phase difference, which is generally invisible, as brightness and darkness of light, that is, perform phase contrast observation.

As described above, in phase difference observation, a unique bright hem called "halo" is formed at the edge of the image of the sample S. This is because part of the zero-order light generated at the edge of the sample S is prevented from passing through the light attenuation region 206a and the phase region 206b. Halo is bright even in the out-of-focus state.

In the sample observation device 200, for detection of the in-focus state, information of all the pixels of the acquired image, that is, the whole light quantity of the light received with the detection element is used. In this case, even when the acquired image includes, for example, a bright region (hereinafter referred to as "region B") caused by halo, the light quantity in the focusing region is smaller than the light quantity before and after the focusing position.

As a result, even in a state in which halo occurs, the interval between the sample and the objective lens is changed on the basis of the emanated light quantity such that the emanated light quantity becomes minimum. In this manner, it is possible to determine the state in which the position of the sample coincides with the focusing position, that is, the focusing position. As described above, according to the sample observation device 200, it is possible to detect the in-focus state, even when pixels having brightness causing an error of detection of the in-focus state are included in all the pixels used for detection of the in-focus state.

Figure 15A:
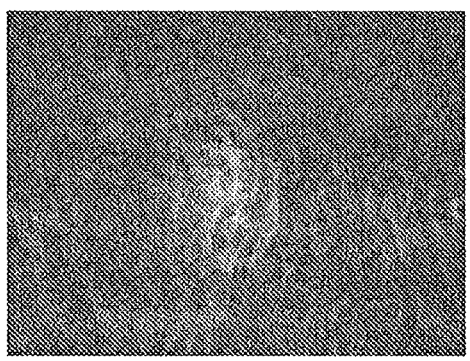
FIG. 15A, FIG. 15B, FIG. 15C, FIG. 15D, and FIG. 15E are diagrams illustrating images of the in-focus state and images of out-of-focus state.
Figure 15B:
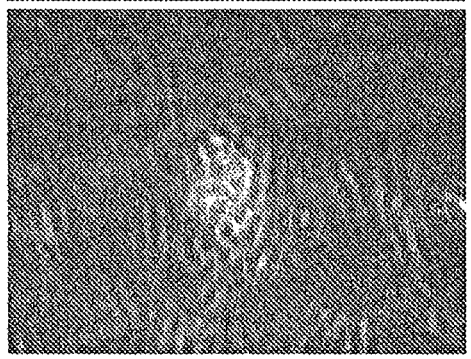
Figure 15C:
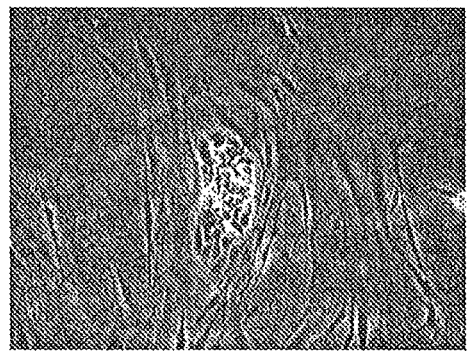
Figure 15D:
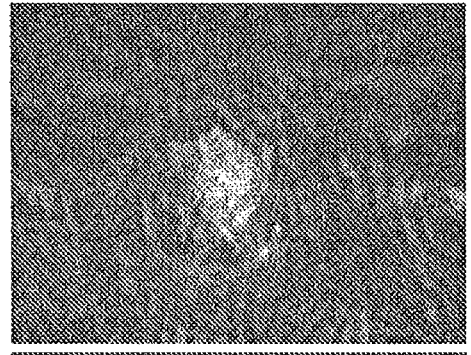

FIG. 15 A, FIG. 15B, FIG. 15C, FIG. 15D, and FIG. 15E illustrate an image of the in-focus state and images of the out-of-focus state. FIG. 15A, FIG. 15B, FIG. 15D, and FIG.

15E are diagrams illustrating images of the out-of-focus state, and FIG. 15C is a diagram illustrating an image of the in-focus state.

Each of the images is acquired with the sample observation device 200. In the sample observation device 200, a phase contrast image is formed. For this reason, each of the images is an image acquired by phase contrast observation. An image of an iPS cell is positioned in the center part of the image, and feeder cells are positioned around the image of the iPS cell.

The shift quantity ΔZ in each of the images is as follows.

Figure 15E:
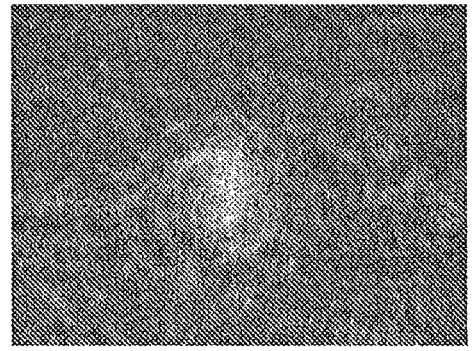

| Image | Shift Quantity ΔZ |
|---|---|
| FIG. 15A | 200 μm |
| FIG. 15B | 100 μm |
| FIG. 15C | 0 μm |
| FIG. 15D | −100 μm |
| FIG. 15E | −200 μm |

Figure 16:
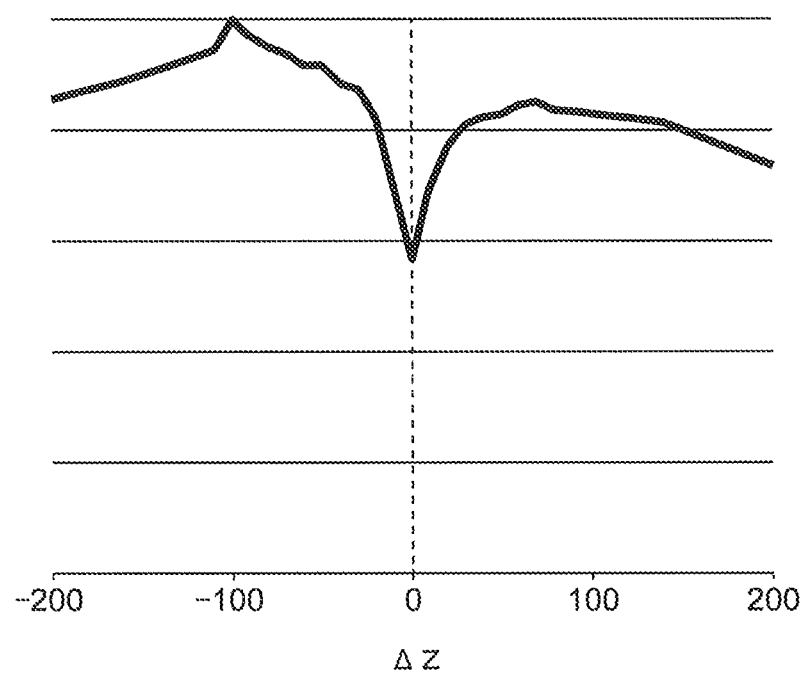
FIG. 16 is a graph illustrating the emanated light quantity and the in-focus state.

FIG. 16 is a graph illustrating the emanated light quantity and the in-focus state. It is possible to determine the emanated light quantity I from the image acquired with the sample observation device 200. The values of the pixels forming the image correspond to the emanated light quantity. It is possible to determine the emanated light quantity I by summing the values for all the pixels.

As is clear from each of the images, halo occurs in images of the iPS cell. In particular, in the image in the in-focus state, specifically, in the image (FIG. 15C) in the case of "ΔZ=0 μm", halo is very bright in comparison with the images in the out-of-focus state.

By contrast, in the graph illustrated in FIG. 16, the emanated light quantity I becomes minimum in the in-focus state, that is, in the case of "ΔZ=0 μm". This means that the structure is hardly influenced by halo in the method of detecting the emanated light quantity I even when halo has high brightness.

As described above, in the focusing method in the sample observation device according to the present embodiment, it is possible to position the sample in the focusing position or a position in the vicinity of the focusing position by changing the interval between the sample and the objective lens such that the emanated light quantity I becomes minimum.

In the sample observation device according to the present embodiment, it is preferable that the illumination optical system and the observation optical system be disposed such that the optical axis of the illumination optical system crosses the optical axis of the observation optical system.

Figure 17:
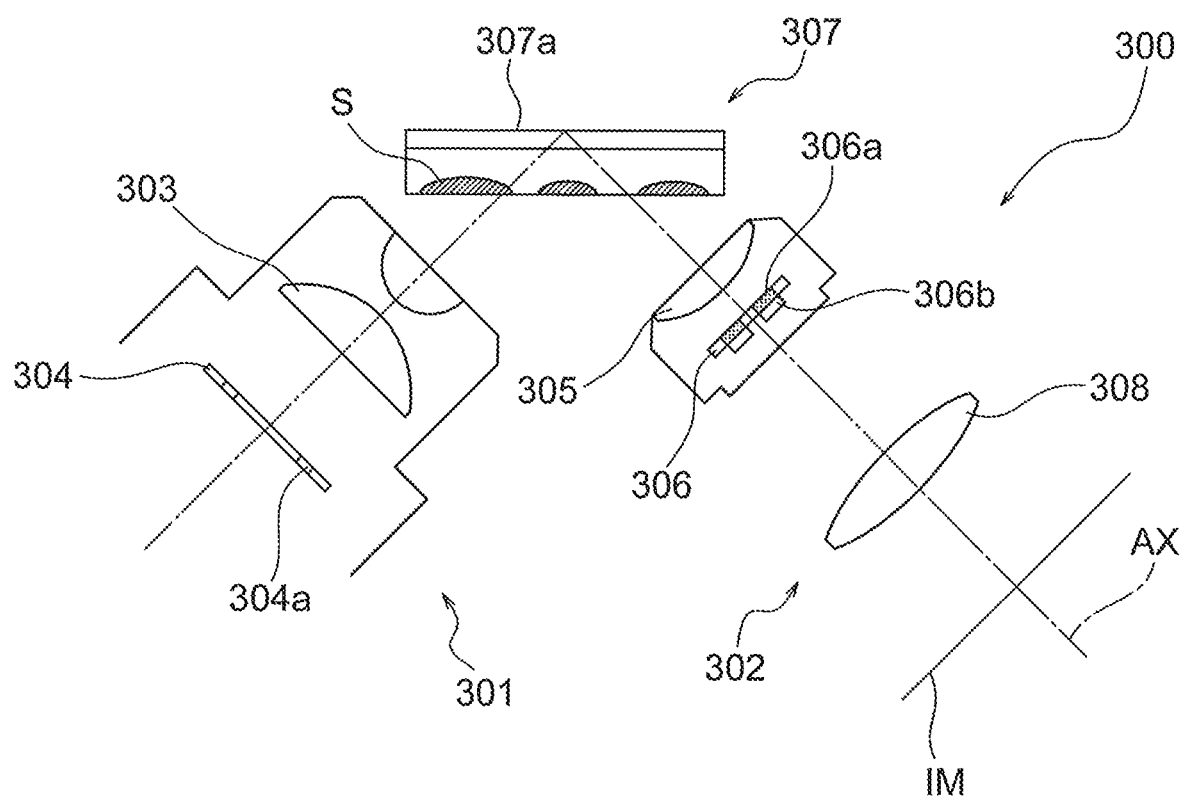
FIG. 17 is a diagram illustrating a main structure of another sample observation device according to the present embodiment.

FIG. 17 is a diagram illustrating a main structure of another sample observation device according to the present embodiment. The optical system of the sample observation device according to the present embodiment is an optical system capable of performing phase contrast observation.

A sample observation device 300 includes an illumination optical system 301 and an observation optical system 302. The sample observation device 300 further includes a light source, a detection element, a processing device, and a drive control device. In FIG. 17, the light source, the detection element, the processing device, and the drive control device are not illustrated.

The illumination optical system 301 includes a condenser lens 303 and an aperture member 304. The observation optical system 302 includes an objective lens 305, a light attenuation member 306, and an imaging lens 308.

Each of the condenser lens 303 and the objective lens 305 is positioned such that the pupil of the condenser lens 303 is conjugate with the pupil of the objective lens 305.

The aperture member 304 is disposed at the pupil position of the illumination optical system 301. More specifically, the aperture member 304 is positioned at the pupil position of the condenser lens 303, that is, the focal position of the condenser lens 303.

The aperture member 304 includes an aperture region 304a. The structure of the aperture member 304 is the same as structure of the aperture member 5. For this reason, an explanation of the aperture member 304 is omitted. The light attenuation member 306 includes a light attenuation region 306a and a phase region 306b. The structure of the light attenuation member 306 is the same as the structure of the light attenuation member 206. For this reason, an explanation of the light attenuation member 306 is omitted.

In the sample observation device 300, the sample S is held in a container 307. In the case where the sample S is a living cell, the cell is held together with liquid, such as a culture fluid, in the container 307. Examples of the container 307 include a petri dish or a micro-well plate. Also in the sample observation device 300, illumination light of parallel light beams is irradiated to the sample S.

In the sample observation device 1, the illumination optical system 2 and the observation optical system 3 are disposed such that the optical axis of the illumination optical system 2 coincides with the optical axis of the observation optical system 3. In this case, illumination light irradiated from the illumination optical system 2 to the sample S passes through the sample S. The observation optical system 3 is positioned in an advancing direction of the illumination light having passed through the sample S. Accordingly, the illumination light having passed through the sample S is made incident on the observation optical system 3.

By contrast, in the sample observation device 300, the illumination optical system 301 and the observation optical system 302 are disposed under the sample S in the paper. Specifically, the illumination optical system 301 and the observation optical system 302 are disposed such that the optical axis of the illumination optical system. 301 crosses the optical axis of the observation optical system 302.

Also in this case, illumination light irradiated from the illumination optical system 301 to the sample S passes through the sample S. However, the observation optical system 302 is not positioned in the advancing direction of the illumination light having passed through the sample S. For this reason, unless anything exists in the advancing direction of the illumination light, the illumination light having passed through the sample S is not made incident on the observation optical system 302.

In the sample observation device 300, a reflective film 307a is formed on the container 307. When the sample S is colorless and transparent, the illumination light irradiated to the sample S is transmitted through the sample S. The illumination light transmitted through the sample S is made incident on the container 307.

The reflective film 307a is positioned above the sample S. The container 307 is disposed such that the surface on which the reflective film 307a is formed faces the sample S side. Accordingly, the illumination light transmitted through the sample S is reflected with the reflective film 307a, and the reflected illumination light is radiated again to the sample S. As a result, transmission illumination is performed on the sample S.

As described above, in the sample observation device 300, it is possible to perform transmission illumination on the sample S, in the same manner as transmission illumination in the sample observation device 1.

In the sample observation device 300, for detection of the in-focus state, the sum total of the light quantities of the image of the sample S is used. In this case, the proportion of the light quantity of halo occupying the sum total of the light quantities is small. For this reason, the structure is hardly influenced by halo. As a result, even in the state in which halo occurs, the interval between the sample and the objective lens is changed on the basis of the emanated light quantity such that the emanated light quantity becomes minimum. In this manner, it is possible to determine the state in which the position of the sample coincides with the focusing position, that is, determine the focusing position.

Moreover, in the sample observation device 300, both the illumination optical system 301 and the observation optical system 302 are positioned on one side of the sample S. For this reason, it is possible to reduce the size of the device.

In the sample observation device according to the present embodiment, it is preferable that the following Conditional Expression (2) be satisfied:

$$0.6 \times ROBout < ROBin < 0.9 \times ROBout \quad (2)$$

where,

ROBin is a distance from the optical axis of the observation optical system to the inner edge of the light attenuation region, and ROBout is a distance from the optical axis of the observation optical system to the outer edge of the light attenuation region.

By satisfying the Conditional Expression (2), it is possible to determine the focusing position with higher accuracy.

In the sample observation device according to the present embodiment, it is preferable that the following Conditional Expression (3) be satisfied:

$$0.8 \times ROBout < \beta \times RILout < ROBout \quad (3)$$

where,

RILout is the distance from the optical axis of the illumination optical system to the outer edge of the aperture region, ROBout is the distance from the optical axis of the observation optical system to the outer edge of the light attenuation region, and $\beta$ is the magnification obtained by dividing the focal length of the objective lens with the focal length of the condenser lens.

By satisfying the Conditional Expression (3), it is possible to determine the focusing position with higher accuracy.

In the sample observation device according to the present embodiment, it is preferable that the following Conditional Expression (4) be satisfied:

$$ROBin < \beta \times RILin < 1.2 \times ROBin \quad (4)$$

where,

RILin is the distance from the optical axis of the illumination optical system to the inner edge of the aperture region, ROBin is the distance from the optical axis of the observation optical system to the inner edge of the light attenuation region, and $\beta$ is the magnification obtained by dividing the focal length of the objective lens with the focal length of the condenser lens.

By satisfying the Conditional Expression (4), it is possible to determine the focusing position with higher accuracy.

As described above, in the sample observation device according to the present embodiment, the light attenuation member is disposed in the observation optical system. The light attenuation region and the non-light-attenuation region are formed in the light attenuation member. For example, as illustrated in FIG. 3C, the annular part serves as the light attenuation region. In this case, apart inner than the annulus and a part outer than the annulus serve as the non-light-attenuation region.

However, the annular part may serve as the non-light-attenuation region. In this case, a part inner than the annulus and a part outer than the annulus serve as the light attenuation region. In this manner, it is possible to determine the state in which the position of the sample coincides with the focusing position, that is, determine the focusing position, by changing the interval between the sample and the objective lens on the basis of the light quantity such that the light quantity becomes maximum.

According to the present embodiment, it is possible to provide a sample observation device having a focusing function capable of detecting an in-focus state, even when pixels having brightness causing an error of detection of the in-focus state are included in all the pixels used for detection of the in-focus state.

As described above, the present invention is suitable for a sample observation device having a focusing function capable of detecting an in-focus state, even when pixels having brightness causing an error of detection of the in-focus state are included in all the pixels used for detection of the in-focus state.

What is claimed is:

1. A sample observation device comprising:
a light source, an illumination optical system, an observation optical system, a detector, a processor, and a drive controller, wherein
the illumination optical system includes a condenser lens and an aperture,
the observation optical system includes an objective lens and a light attenuation member,
the aperture is disposed at a pupil position of the illumination optical system, or disposed at a position conjugate with a pupil of the illumination optical system,
the light attenuation member is disposed at a position conjugate with the aperture,
the aperture includes an aperture region,
the light attenuation member includes a light attenuation region,
a determination region is a region including both an image of the aperture region and the light attenuation region,
a predetermined state is a state in which the image of the aperture region is positioned only in an area of the light attenuation region in the determination region,
a size of the aperture region, a position of the aperture region, a size of the light attenuation region, and a position of the light attenuation region are set such that the predetermined state is generated,
illumination light irradiated to a sample with the illumination optical system is transmitted through the sample and thereafter made incident on the observation optical system,
the detector receives light emanated from the observation optical system,
the processor determines light quantity of the light received with the detector, and
the drive controller changes an interval between the sample and the objective lens on the basis of the light quantity such that the light quantity becomes minimum.

2. The sample observation device according to claim 1, wherein the detector includes minute light receiving elements arranged in a two-dimensional manner.

3. The sample observation device according to claim 1, wherein each of the aperture region and the light attenuation region is annulus.

4. The sample observation device according to claim 2, wherein the following Conditional Expression (1) is satisfied:

$$ROBin < \beta \times RILin < \beta \times RILout < ROBout \quad (1)$$

where,
- RILin is a distance from an optical axis of the illumination optical system to an inner edge of the aperture region,
- RILout is a distance from the optical axis of the illumination optical system to an outer edge of the aperture region,
- ROBin is a distance from an optical axis of the observation optical system to an inner edge of the light attenuation region,
- ROBout is a distance from the optical axis of the observation optical system to an outer edge of the light attenuation region, and
- $\beta$ is a magnification obtained by dividing a focal length of the objective lens by a focal length of the condenser lens.

5. The sample observation device according to claim 1, wherein
the light attenuation member includes a phase region, and
at least part of the phase region overlaps at least part of the light attenuation region.

6. The sample observation device according to claim 1, wherein the illumination optical system and the observation optical system are disposed such that an optical axis of the illumination optical system crosses an optical axis of the observation optical system.

7. The sample observation device according to claim 2, wherein the following Conditional Expression (2) is satisfied:

$$0.6 \times ROBout < ROBin < 0.9 \times ROBout \quad (2)$$

where,
- ROBin is a distance from an optical axis of the observation optical system to an inner edge of the light attenuation region, and
- ROBout is a distance from the optical axis of the observation optical system to an outer edge of the light attenuation region.

8. The sample observation device according to claim 2, wherein the following Conditional Expression (3) is satisfied:

$$0.8 \times ROBout < \beta \times RILout < ROBout \quad (3)$$

where,
- RILout is a distance from an optical axis of the illumination optical system to an outer edge of the aperture region,
- ROBout is a distance from an optical axis of the observation optical system to an outer edge of the light attenuation region, and
- $\beta$ is a magnification obtained by dividing a focal length of the objective lens with a focal length of the condenser lens.

9. The sample observation device according to claim 2, wherein the following Conditional Expression (4) is satisfied:

$$ROBin < \beta \times RILin < 1.2 \times ROBin \quad (4)$$

where,
- RILin is a distance from an optical axis of the illumination optical system to an inner edge of the aperture region,
- ROBin is a distance from an optical axis of the observation optical system to an inner edge of the light attenuation region, and
- $\beta$ is a magnification obtained by dividing a focal length of the objective lens with a focal length of the condenser lens.

* * * * *